(12) United States Patent
Koo

(10) Patent No.: US 10,979,326 B2
(45) Date of Patent: Apr. 13, 2021

(54) DETECTING INTERFERENCE OF A BEAM

(71) Applicant: VIAVI Solutions Inc., San Jose, CA (US)

(72) Inventor: Eng Wei Koo, Colorado Springs, CO (US)

(73) Assignee: VIAVI Solutions Inc., San Jose, CA (US)

(*) Notice: Subject to any disclaimer, the term of this patent is extended or adjusted under 35 U.S.C. 154(b) by 0 days.

(21) Appl. No.: 16/232,814

(22) Filed: Dec. 26, 2018

(65) Prior Publication Data
US 2020/0127907 A1 Apr. 23, 2020

Related U.S. Application Data

(60) Provisional application No. 62/746,835, filed on Oct. 17, 2018, provisional application No. 62/670,471, filed on May 11, 2018.

(51) Int. Cl.
*H04L 12/26* (2006.01)
*H04W 24/10* (2009.01)
(Continued)

(52) U.S. Cl.
CPC .............. *H04L 43/08* (2013.01); *H04L 43/06* (2013.01); *H04W 16/28* (2013.01); *H04W 24/02* (2013.01);
(Continued)

(58) Field of Classification Search
CPC ..... H04L 43/06; H04L 43/08; H04L 43/0864; H04L 43/0888; H04W 16/28;
(Continued)

(56) References Cited

U.S. PATENT DOCUMENTS

| 7,020,701 B1 | 3/2006 | Gelvin et al. |
| 7,797,367 B1 | 9/2010 | Gelvin et al. |

(Continued)

FOREIGN PATENT DOCUMENTS

| CN | 104849731 A | 8/2015 |
| CN | 106489286 A | 3/2017 |

(Continued)

OTHER PUBLICATIONS

3GPP, "3GPP TS 37.340 3rd Generation Partnership Project; Technical Specification Group Radio Access Network; Evolved Universal Terrestrial Radio Access (E-UTRA) and NR; Multiconnectivity; Stage 2 (Release 15)," www.3gpp.org/DynaReport/37340.htm, Sep. 2018, 59 pages.

(Continued)

*Primary Examiner* — Luat Phung
*Assistant Examiner* — Kai Chang
(74) *Attorney, Agent, or Firm* — Harrity & Harrity, LLP

(57) ABSTRACT

A device may monitor traffic or a data feed associated with a user equipment (UE). The traffic or the data feed may include a set of parameters related to a temporary interference to a beam of a respective set of beams associated with the UE, a user experience of a user of the UE, or a quality of a communication link between the UE and a base station (BS), of a set of network slices used by the UE, or of a quality of (QoS) profile associated with the UE. The device may perform a first analysis related to identifying the temporary interference, a second analysis related to determining the user experience, or a third analysis related to determining the quality. The device may perform one or more actions related to addressing the temporary interference, the user experience, or the quality.

20 Claims, 13 Drawing Sheets

(51) Int. Cl.
  *H04W 16/28* (2009.01)
  *H04W 24/08* (2009.01)
  *H04W 72/12* (2009.01)
  *H04W 24/02* (2009.01)
  *H04W 28/02* (2009.01)

(52) U.S. Cl.
  CPC ............ *H04W 24/08* (2013.01); *H04W 24/10* (2013.01); *H04W 28/0236* (2013.01); *H04W 72/1226* (2013.01); *H04W 72/1231* (2013.01)

(58) Field of Classification Search
  CPC ..... H04W 24/02; H04W 24/08; H04W 24/10; H04W 28/0236; H04W 72/1226; H04W 72/1231; H04W 24/04
  See application file for complete search history.

(56) References Cited

U.S. PATENT DOCUMENTS

| | | | |
|---|---|---|---|
| 9,047,441 | B2 | 6/2015 | Xie et al. |
| 9,955,332 | B2 | 4/2018 | Raleigh et al. |
| 10,142,276 | B2 | 11/2018 | Rapaport et al. |
| 10,548,181 | B2* | 1/2020 | Siomina ............... H04W 48/16 |
| 10,560,206 | B2 | 2/2020 | Inzunza et al. |
| 2007/0135039 | A1 | 6/2007 | Yi et al. |
| 2010/0246712 | A1 | 9/2010 | Suo et al. |
| 2012/0155324 | A1 | 6/2012 | Janakiraman et al. |
| 2012/0159151 | A1 | 6/2012 | Janakiraman et al. |
| 2012/0252521 | A1* | 10/2012 | Nagaraja ............ H04W 52/243 455/522 |
| 2013/0064279 | A1 | 3/2013 | Nielsen et al. |
| 2013/0100830 | A1* | 4/2013 | Brady .................... H04L 43/10 370/252 |
| 2013/0121342 | A1 | 5/2013 | Kim |
| 2014/0080447 | A1 | 3/2014 | Janakiraman et al. |
| 2014/0293914 | A1* | 10/2014 | Maattanen ........ H04W 72/1278 370/329 |
| 2014/0376390 | A1 | 12/2014 | Kreher et al. |
| 2015/0006100 | A1 | 1/2015 | Jackson et al. |
| 2015/0098352 | A1* | 4/2015 | Froehlich ............. H04W 24/08 370/252 |
| 2015/0181442 | A1 | 6/2015 | Zinevich |
| 2015/0327091 | A1 | 11/2015 | Curtin et al. |
| 2015/0358989 | A1* | 12/2015 | Ni ........................ H04B 7/0626 370/330 |
| 2016/0065419 | A1 | 3/2016 | Szilagyi et al. |
| 2016/0119796 | A1 | 4/2016 | Ho et al. |
| 2016/0157277 | A1* | 6/2016 | Hardouin ............ H04W 72/042 370/329 |
| 2016/0269900 | A1 | 9/2016 | Goldfarb |
| 2016/0323754 | A1 | 11/2016 | Friday et al. |
| 2016/0323763 | A1* | 11/2016 | Xu ........................ H04W 24/02 |
| 2016/0330641 | A1* | 11/2016 | Zhang ................... H04W 24/02 |
| 2016/0330643 | A1* | 11/2016 | Sahin ................... H04W 16/14 |
| 2016/0353316 | A1* | 12/2016 | Boettger ........... H04W 36/0066 |
| 2017/0006492 | A1* | 1/2017 | Khoshnevisan ..... H04B 7/0626 |
| 2017/0064591 | A1* | 3/2017 | Padfield ............... H04W 36/20 |
| 2017/0215221 | A1 | 7/2017 | Segev et al. |
| 2017/0245175 | A1 | 8/2017 | Nambi et al. |
| 2017/0347251 | A1 | 11/2017 | Kim et al. |
| 2018/0013655 | A1* | 1/2018 | Ameixieira ........... H04L 5/0032 |
| 2018/0115958 | A1 | 4/2018 | Raghavan et al. |
| 2018/0213560 | A1* | 7/2018 | Naghshvar ........ H04W 74/0816 |
| 2018/0321687 | A1 | 11/2018 | Chambers et al. |
| 2018/0359739 | A1* | 12/2018 | Boldi ................. H04W 72/0406 |
| 2019/0068512 | A1* | 2/2019 | Papaloukopoulos ... H04L 43/08 |
| 2019/0109810 | A1 | 4/2019 | Rapaport et al. |
| 2019/0110335 | A1* | 4/2019 | Zhang .................. H04B 17/336 |
| 2019/0132066 | A1 | 5/2019 | Park et al. |
| 2019/0166106 | A1* | 5/2019 | Munro ................ H04L 63/0892 |
| 2019/0182800 | A1 | 6/2019 | Park et al. |
| 2019/0268962 | A1* | 8/2019 | Wang .................. H04B 17/318 |
| 2020/0077451 | A1* | 3/2020 | You .................... H04W 74/0833 |
| 2020/0092838 | A1* | 3/2020 | Koo ..................... H04W 64/00 |
| 2020/0186267 | A1 | 6/2020 | Inzunza et al. |

FOREIGN PATENT DOCUMENTS

| | | |
|---|---|---|
| EP | 2469752 A1 | 6/2012 |
| EP | 2469761 A1 | 6/2012 |
| EP | 2874449 A1 | 5/2015 |
| EP | 2945317 A1 | 11/2015 |
| EP | 3030020 A1 | 6/2016 |
| WO | 2015095846 A2 | 6/2015 |
| WO | 2016091298 A1 | 6/2016 |
| WO | 2019217723 A1 | 11/2019 |

OTHER PUBLICATIONS

3GPP, "3GPP TS 38.401 3rd Generation Partnership Project; Technical Specification Group Radio Access Network; NG-RAN; Architecture description (Release 15)," www.3gpp.org/DynaReport/38401.htm, Sep. 2018, 39 pages.

3GPP, "3rd Generation Partnership Project; Technical Specification Group Radio Access Network; Evolved Universal Terrestrial Radio Access Network (E-UTRAN); X2 application protocol (X2AP) (Release 15)," https://portal.3gpp.org/desktopmodules/specifications/specificationsDetails.aspx?specificationsid=2452, Sep. 2018, 401 pages.

3GPP, "3rd Generation Partnership Project; Technical Specification Group Radio Access Network; NR; Radio Resource Control (RRC) protocol specification (Release 15)," https://portal.3gpp.org/desktopmodules/specifications/specificationsDetails.aspx?specificationsid=3197, Sep. 2018, 445 pages.

3GPP, "3rd Generation Partnership Project; Technical Specification Group Radio Access Network; Study on eNB(s) Architecture Evolution for E-UTRAN and NG-RAN (Release 15)," https://portal.3gpp.org/desktopmodules/Specifications/SpecificationDetails.aspx?specificationId=3365, Mar. 2018, 15 pages.

3GPP, "3rd Generation Partnership Project; Technical Specification Group Radio Access Network; Study on New Radio Access Technology; Radio Interface Protocol Aspects (Release 14)," https://portal.3gpp.org/desktopmodules/Specifications/SpecificationDetails.aspx?specificationId=3070, Mar. 2017, 57 pages.

3GPP, "Scheduling and HARQ support for NR CA," https://portal.3gpp.org/ngppapp/CreateTdoc.aspx?mode=view&contributionId=799570, Jun. 30, 2017, 4 pages.

3GPP, "Clarification on Desired Buffer Size," https://portal.3gpp.org/ngppapp/CreateTdoc.aspx?mode=view&contributionId=845969, Dec. 1, 2017, 6 pages.

3GPP, "On the Details of CSI Acquisition," http://www.3gpp.org/ftp/tsg_ran/wg1_ri1/TSGR1_AH/NR_AH 1706/Docs/, Jun. 30, 2017, 3 pages.

3GPP, "PUCCH resource allocation," http://www.3gpp.org/ftp/tsg_ran/wg1_ri1/TSGR1_AH/NR_AH 1706/Docs/, Jun. 30, 2017, 3 pages.

3GPP, "Test Scope for NR Initial Access and Beam Management at FR2," https://portal.3gpp.orgngppapp/CreateTdoc.aspx?mode=view&contributionId=842909, Dec. 1, 2017, 6 pages.

ETSI, "Digital Cellular Telecommunications System (Phase 2+)," https://www.etsi.oprg/deliver/etsits/133400_133499/08.02.01_60/ts_133401v080201p.pdf, Jan. 2009, 60 pages.

Extended European Search Report for Application No. EP18208725.4, dated Jan. 31, 2019, 9 pages.

GSM Association, "Mobile World Congress Americas 2017, San Francisco," https://www.gsma.com/'futurenetworks/events-and-webinars/mwc-americans-san-francisco/,Sep. 12, 2017, 9 pages.

Rohde & Schwarz, "Signal & Spectrum Analyzers," https://www.youtube.com/playlist?list=PLKxVoO5jUTIsxZXja8m6AH-02pBvHdGrE, Oct. 10, 2018, 10 pages.

Rohde & Schwarz, "Network Analyzers," https://www.youtube.com/playlist?list=PLKxVoO5jUTIV9g-mf65Rj7v8uQ0F9TwW, Mar. 19, 2018, 7 pages.

Rohde & Schwarz, "R&S®TSME6 Ultracompact Drive Test Scanner; All bands, all technologies, Simultaneously, Future-Proof Upgradability," http://cdn.rohde-schwarz.com/pws/dl_downloads/dl_common_library/dl_brochure_and_datasheets/pdf_1/service_support_30/TSME6_bro_en_3607.873-12_v0201.pdf, Jun. 28, 2018, 16 pages.

(56) References Cited

OTHER PUBLICATIONS

Sanjole, Inc., "WaveJudge 5000 LTE Analyzer," http://www.sanjole.com/our-products/lteanalyzer/, Dec. 2, 2008, 2 pages.

SGLLABS, "GenComm (JDSU), GC747A," https://www.sglabs.it/en/product.php?s=gencommjdsu-gc747a&id=1822, Oct. 12, 2018, 20 pages.

Sibila A., "5G: Initial 5GTF Coverage Measurements (part 2)," htttps://blog.mobile-network-testing.com/market-technology-trends/evolving-technologies/5g-coverage-measurements/, Jun. 12, 2018, 6 pages.

Sibila A., et al., "5G NR Network Deployment is Now—Let's Test!," Oct. 2018, 59 pages.

Telecomsource, "LTE Security Architecture," http://www.telecomsource.net/entry.php?658-LTE-Security-Architecture&style=12, Retrieved on Jul. 12, 2018, 3 pages.

Via VI Solutions Inc., "AriesoGEO," https://www.viasolutions.com/en-us/product-family/ariesogeo, Nov. 24, 2015, 8 pages.

Via VI Solutions Inc., "CellAdvisor," https://www.viasolutions.com/en-us/product-family/celladvisor, Jun. 19, 2016, 9 pages.

Via VI Solutions Inc., "Get geo-located, App-Aware Insight," https://www.viavisolutions.com/en-us/solutions-time-intelligence/nitro/nitro-mobile, Feb. 2018, 4 pages.

Via VI Solutions Inc., "T-BERD/MTS-5800 Handheld Network Tester," https://www.viavisolutions.com/en-us/products/t-berd-mts-5800-handheld-network-tester, Sep. 12, 2016, 5 pages.

Via VI Solutions Inc., "xSIGHT," htttps://www.viasolutions.com/en-us/product-family-xsight, May 17, 2014, 5 pages.

Wikipedia, "Drive Testing," https://en.wikipedia.org/wiki/Drive_testing, Sep. 22, 2010, 3 pages.

3GPP, "3rd Generation Partnership Project; Technical Specification Group Services and System Aspects; Study of Enablers for Network Automation for 5G; (Release 16)", 3GPP Standard, Technical Report, 3GPP TR 23.791, 3rd Generation Partnership Project (3GPP), France, vol. SA WG2 (V0.3.0), May 2, 2018, pp. 1-19, XP051451264, pp. 1-16, [retrieved on May 2, 2018].

3GPP, "3rd Generation Partnership Project; Technical Specification Group Services and System Aspects; Study on Cellular IoT support and evolution for the 5G System (Release 16)", 3GPP Standard, Technical Report, 3GPP TR 23.724, 3rd Generation Partnership Project (3GPP), Mobile Competence Centre, 650, Route Des Lucioles, F-06921 Sophia-Antipolis Cedex, France, vol. SA WG2 (V0.3.0), May 2, 2018, pp. 1-154, pp. 86-89, XP051451260, [retrieved on May 2, 2018].

International Search Report and Written Opinion for the Application No. PCT/US2019/031581, dated Oct. 1, 2019, 15 pages.

Extended European Search Report for Application No. EP18211705.1, dated Apr. 11, 2019, 12 pages.

Extended European Search Report for Application No. EP19197415.3, dated Feb. 13, 2020, 17 pages.

* cited by examiner

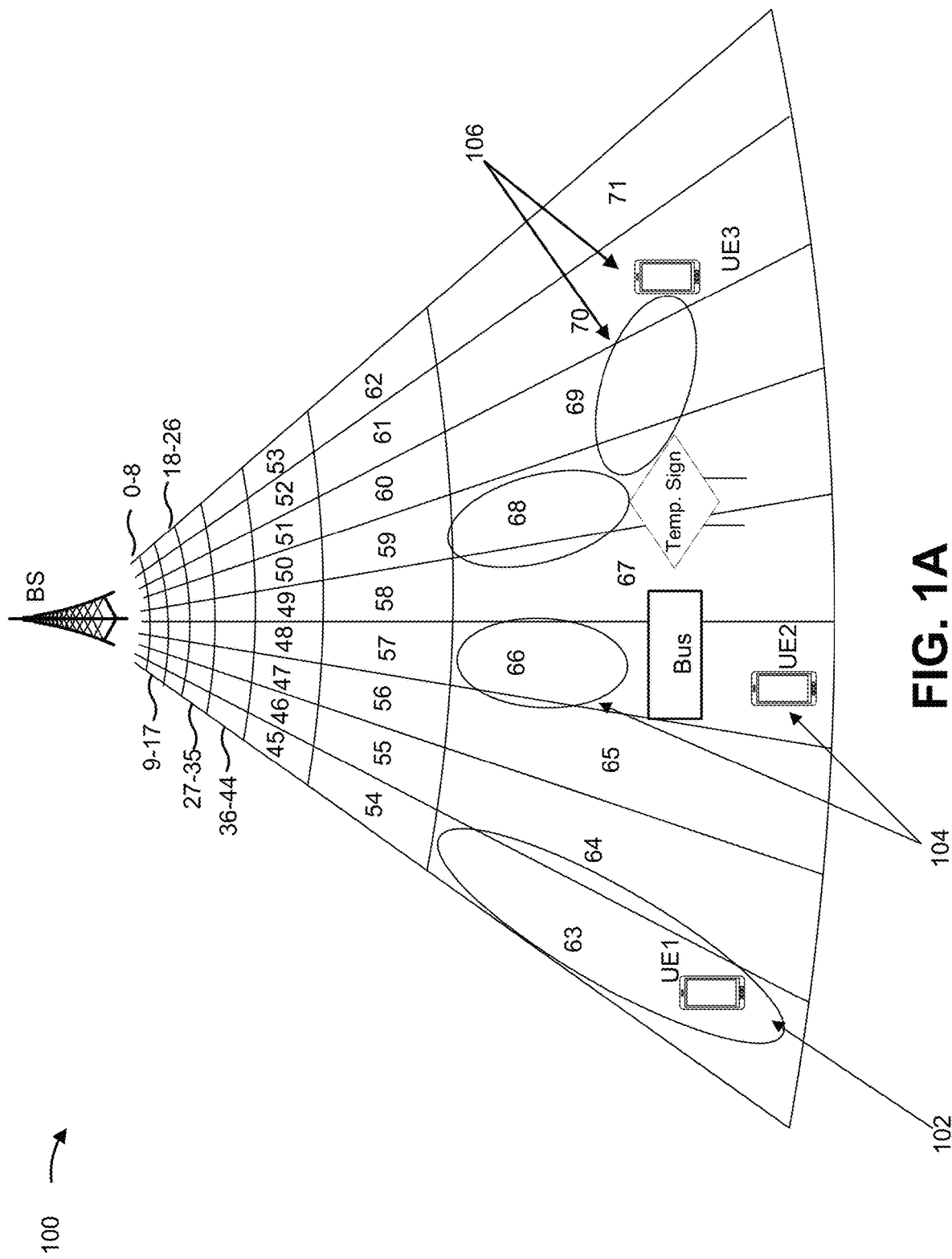

DETECTING INTERFERENCE OF A BEAM

RELATED APPLICATION

This application claims priority under 35 U.S.C. § 119 to U.S. Provisional Application No. 62/670,471, filed on May 11, 2018, and U.S. Provisional Application No. 62/746,835, filed on Oct. 17, 2018, the content of which are incorporated by reference herein in their entireties.

BACKGROUND

Within a network, interfaces connect various components to or within the network. For example, in a long-term evolution (LTE) network, interfaces permit a mobility management entity device (MME), a serving gateway (SGW), a packet data network gateway (PGW), and/or the like to communicate. In 5G/new radio (NR), a base station transmits a set of beams associated with a cell.

SUMMARY

According to some implementations, a method may comprise: monitoring, by a device, traffic associated with a user equipment (UE) on multiple interfaces of a network, wherein the traffic identifies a set of cells, with a respective set of beams, associated with the UE; determining, by the device and after monitoring the traffic, an identity associated with the UE or the traffic on the multiple interfaces by correlating identifiers associated with the UE or the traffic across the multiple interfaces, wherein the identity uniquely identifies a subscriber, a network slice, or a quality of service (QoS) profile associated with the UE or the traffic; performing, by the device and after determining the identity, an analysis related to at least one of: identifying a temporary interference to a beam of the respective set of beams, determining a user experience of a user of the UE, or determining a quality of a communication link between the UE and a base station (BS); and performing, by the device and in association with performing the analysis, one or more actions related to addressing the temporary interference, the user experience, or the quality of the communication link.

According to some implementations, a device may comprise: one or more memories; and one or more processors, communicatively coupled to the one or more memories, configured to: monitor traffic or a data feed associated with a user equipment (UE), wherein the traffic or the data feed includes a set of parameters related to at least one of: a temporary interference to a beam of a respective set of beams associated with the UE, a user experience of a user of the UE, or a quality of a communication link between the UE and a base station (BS), of a set of network slices used by the UE, or of a quality of service (QoS) profile associated with the UE; perform, after monitoring the traffic or the data feed, at least one of: a first analysis related to identifying the temporary interference to the beam of the respective set of beams associated with the UE, a second analysis related to determining the user experience of the user of the UE, or a third analysis related to determining the quality of the communication link between the UE and the BS, of the set of network slices, or of the QoS profile; and perform, in association with performing the first analysis, the second analysis, or the third analysis, one or more actions related to addressing the temporary interference, the user experience of the user of the UE, or the quality of the communication link, of the set of network slices, or of the QoS profile.

According to some implementations, a non-transitory computer-readable medium may store instructions that, when executed by one or more processors of a device, cause the one or more processors to: determine an identity associated with a UE or traffic on multiple interfaces of a network by correlating identifiers associated with the UE or the traffic across the multiple interfaces, wherein the identity uniquely identifies the UE associated with the traffic or a subscriber associated with the UE or the traffic, and wherein the traffic includes a set of parameters for the traffic; determine, after determining the identity associated with the UE, a location of the UE based on a set of cells associated with a BS, a respective set of beams associated with the set of cells, or a respective set of measurements for the respective set of beams; perform, after determining the location of the UE, an analysis related to at least one of: identifying a temporary interference to a beam of the respect set of beams, determining a user experience of a user of the UE, or determining a quality of a communication link between the UE and the BS, of a set of network slices associated with the UE, or of a quality of service (QoS) profile associated with the UE; and perform, in association with performing the analysis, one or more actions related to addressing the at least one of the temporary interference, the user experience, or the quality of the communication link, of the set of network slices, or of the QoS profile.

BRIEF DESCRIPTION OF THE DRAWINGS

FIGS. 1A-1E are diagrams of one or more example implementations described herein.

DETAILED DESCRIPTION

Figure 1B:
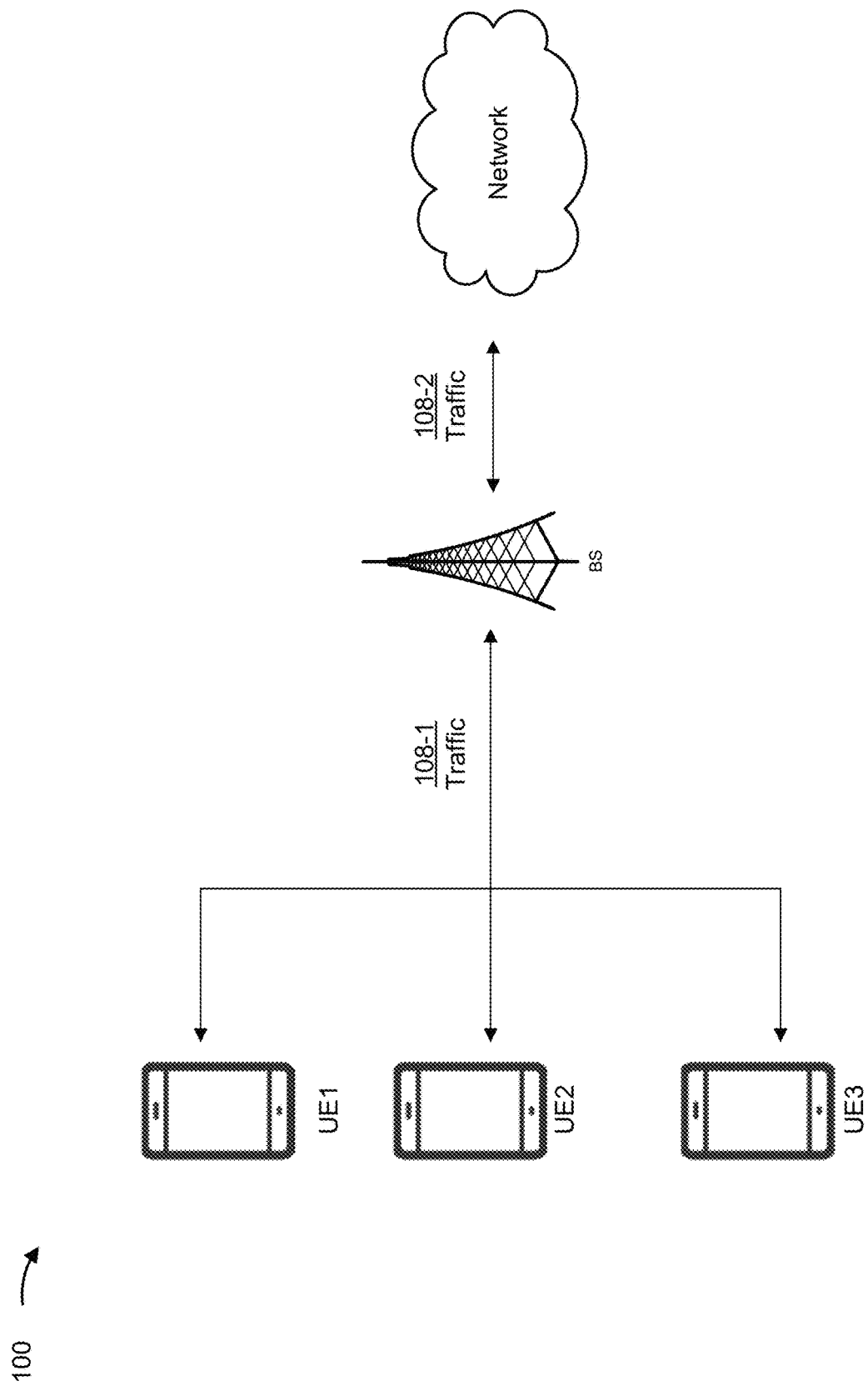

The following detailed description of example implementations refers to the accompanying drawings. The same reference numbers in different drawings may identify the same or similar elements.

In a beamformed environment, a base station (BS) communicates with a user equipment (UE) via use of beams. While use of beams may improve data and/or coverage beam throughput, reliability, latency, and/or the like with regard to communications between the BS and the UE, the beams can be easily blocked, reflected, and/or the like due to physical obstructions between the BS and the UE (e.g., use of beams requires a line of sight between the BS and the UE). When these physical obstructions are temporary in nature, such as when the physical obstruction is a vehicle on a road, a temporary structure for an event, blockage by an individual or a group of individuals, and/or the like, a network service provider may not be capable of accounting for the physical obstructions during cell site planning for the BS due to the temporary nature of interferences caused by the physical obstruction. Further, after a cell site has been deployed, identifying temporary interferences and/or severities of the temporary interferences (e.g., impacts on a user experience, on a quality of a communication link, and/or the like) caused by physical obstructions may be difficult if not impossible. For example, to identify a temporary interference, a network service provider may need to use drive tests and/or walk tests, which are expensive and inaccurate, and/or may need to rely on customer complaints, which include incomplete and/or inaccurate information. Additionally, or alternatively, and as another example, the network service provider may not be capable of using network monitoring to identify a temporary blockage, to determine a user experience, and/or to determine a quality of a communication link due to not being capable of assessing these issues from the perspective of a UE via this technique. Other techniques fail to provide the network service provider with the capability to identify a temporary blockage, to determine a user experience, and/or to determine a quality of a communication link. For example, installing test agents on UEs requires opt-in from users of the UEs, which is difficult to obtain due to privacy concerns, a need for the users to take positive action to opt-in, and/or the like. Additionally, or alternatively, and as another example, a minimization of drive test (MDT) technique includes use of a limited set of measurements, in-use reporting from applications installed on the UE is not available for all applications and lacks some measurements needed for these types of analyses, and/or the like.

Some implementations described herein provide a traffic monitoring device that is capable of monitoring traffic on various interfaces of a network, correlating the traffic to various UEs, and identifying beams that are associated with the various UEs, measurements for the beams, patterns of beams associated with the various UEs at a same location over time, and/or the like. In this way, the traffic monitoring device is capable of detecting temporary interferences to a set of beams from a BS, determining a user experience of a user of a UE from the perspective of the UE, and/or determining a quality of a communication link between a UE and a BS. This provides a tool that is capable of detecting and/or geolocating temporary interferences (or permanent interferences) that would otherwise be difficult, if not impossible, to detect (e.g., in situations where an interference occurs after a network operator has deployed a cell site and/or where performing periodic drive and/or walk tests is expensive), thereby improving communications associated with a cell site that were previously experiencing a temporary interference. In addition, the traffic monitoring device may perform actions to reduce (or assist with reducing) an occurrence of, or to eliminate, a temporary interference, thereby conserving processing resources of a BS and/or a UE that would otherwise be consumed as a result of the temporary interference. Further, by determining a user experience and/or a quality of a communication link in a manner not previously possible, the traffic monitoring device provides a tool that can be used to improve operations of a UE, which conserves processing resources of the UE that would otherwise be consumed as a result of a poor user experience and/or a poor quality communication link.

FIGS. 1A-1E are diagrams of an example implementation 100 described herein. As shown in FIGS. 1A-1E, implementation 100 include a base station (BS), multiple user equipment (UEs) (shown as UE1 through UE3), a traffic monitoring device, a mobility management entity (MME), and a serving gateway (SGW).

As shown in FIG. 1A, the BS may transmit multiple beams (e.g., user-dedicated beams, coverage beams, and/or the like) for a cell, shown as beams 0 through 71. In some implementations, the BS may be configured to transmit a beam to a particular distance from the BS (e.g., to a location which can be horizontal in space and/or vertical in space), with a particular radius, with a beam width (e.g., in degrees), and/or the like. For example, a beam may have a one degree beam width and may be transmitted to a point 20 meters from the BS, resulting in a radius of 0.17 meters.

As shown by reference number 102, UE1 may be within beam coverage of the BS (e.g., may be within a cell coverage associated with the BS). In some implementations, UE1 may receive a set of beams when within beam coverage of the BS. In some implementations, and as further shown by reference number 102, UE1 may be using beam 63 as a connected beam.

The implementations described herein apply to both coverage beams (e.g., as shown in FIG. 1A) and to user-dedicated data beams. For example, UEs shown in FIG. 1A may be connected to a set of coverage beams, may be connected to a set of user-dedicated data beams, may receive a set of coverage beams (e.g., a set of surrounding coverage beams), may receive a set of user-dedicated data beams (e.g., a set of surrounding user-dedicated data beams), and/or the like. In some implementations, due to overlap of beam coverage (e.g., overlap of synchronization signal and physical broadcast channel (PBCH) blocks (SSBs)), UE1 may be receiving, but not using, one or more other beams that are proximate in location to the connected beam (e.g., referred to as "surrounding beams" herein). For example, based on using beam 63 as a connected beam, UE1 may receive beams 54, 55, and 64 as surrounding beams. In some implementations, surrounding beams that a UE is receiving may be from one or more cells. For example, although FIG. 1A shows a single BS and a single cell, in reality, there may be multiple BSs, each associated with one or more cells. In some implementations, a cell may be associated with one or more coverage beams (e.g., SSBs) and/or one or more user-dedicated data beams (e.g., channel state information reference signals (CSI-RSs)).

In some implementations, UE1 may perform various measurements related to the connected beam and/or the set of surrounding beams. For example, UE1 may perform measurements of a respective reference signal received power (RSRP) of the set of beams, a respective reference signal received quality (RSRQ) of the set of beams, a respective signal-to-interference-plus-noise ratio (SINR) of the set of beams, and/or the like. In some implementations, UE1 may perform the various measurements related to the set of beams periodically, according to a schedule, based on being requested by a network provider (by the BS) to perform the various measurements, based on being handed over from one cell to another cell, based on detecting a threshold amount of power associated with a beam, based on an event (e.g., event-triggered), periodically based on an event (e.g., event-triggered periodic), and/or the like.

As shown by reference number 104, UE2 may be located within an intended coverage of beam 66 as a connected beam. However, and as further shown by reference number 104, beam 66 may be completely, or partially, obstructed from being received by UE2 by a physical obstruction. For example, and as shown in FIG. 1A, the physical obstruction may be a bus, or another type of vehicle. In some implementations, the physical obstruction may be temporarily positioned and, as a result, may cause a temporary interference to beam 66 for UE2 (e.g., an interference for a period of time, a pattern of interference and non-interference over time, and/or the like). Based on beam 66 being obstructed, UE2 may be using a beam other than beam 66 as a connected beam, may be using beam 66, with degraded values for measurements, as a connected beam, may not be using a connected beam, and/or the like. In some implementations, UE2 may be receiving surrounding beams, such as beams 65 and 67, may fail to receive an expected surrounding beam (such as beam 57) due to the physical obstruction, and/or the like.

In some implementations, UE2 may perform measurements for received beams in a manner that is the same as or similar to that described elsewhere herein. For example, UE2 may fail to determine values or may determine degraded values for a beam that is obstructed by the physical obstruction (e.g., beams 57 and 66). Additionally, or alternatively, and continuing with the previous example, UE2 may determine values for beams being received by UE2 (e.g., beams 65 and 67).

As shown by reference number 106, UE3 may be located in coverage of beam 70 as a connected beam. In addition, and as further shown by reference number 106, UE3 may be receiving beams 60, 61, 62, 69, and/or 71 as surrounding beams. In addition, and as further shown by reference number 106, UE3 may be receiving a beam reflection of beam 68 from a physical object (e.g., beam 68 may not be a beam that UE3 would normally receive at the location of UE3 shown in FIG. 1A). For example, the physical object may be a temporary road sign, a temporary structure for an event, and/or the like and, as a result, may cause a temporary interference of beam 70 via a temporary beam reflection of beam 68. In some implementations, UE3 may perform measurements of beams received by UE3 in a manner similar to that described elsewhere herein. For example, UE3 may determine a measurement for a beam that is being reflected from the physical object (e.g., a value of the measurement for the reflected beam may fail to satisfy a threshold, may indicate that UE3 is unexpectedly receiving the reflected beam, may indicate interference with another beam that UE3 is receiving, and/or the like).

Turning to FIG. 1B, and as shown by reference number 108-1, UE1 through UE3 may exchange, with a BS (e.g., a serving BS when a UE is in a connected mode), traffic. As shown by reference number 108-2, the BS may exchange traffic with a network. In some implementations, the traffic may include downlink user data and values for various parameters associated with the downlink user data, such as a value for a discarded block parameter, a value for a downlink flush parameter, and/or the like. Additionally, or alternatively, and as another example, the traffic may include a downlink data delivery status message and values for various parameters associated with the downlink data delivery status message, such as a value for a cause report parameter, a value for a cause value parameter, a value for a highest successfully delivered retransmitted new radio (NR) packet data convergence protocol (PDCP) sequence number parameter, a value for a data rate indication parameter, a value for a desired buffer size for the data radio bearer parameter, and/or the like. Additionally, or alternatively, and as another example, the traffic may include an assistance information data message and values for various parameters associated with the assistance information data message, such as a value for an assistance information type parameter (e.g., a downlink radio quality index, an uplink radio quality index, an average quantity of hybrid automatic request repeat (HARQ) retransmissions, and/or the like), a value for a radio quality assistance information parameter, and/or the like.

In some implementations, the traffic may include measurement reports of the measurements that UE1 through UE3 performed. For example, UE1 through UE3 may provide the measurement reports to a 4G evolved NodeB (eNB), a 5G next generation NodeB (gNB), and/or the like. In some implementations, the measurement reports may be included in a radio resource control (RRC) transfer (e.g., an NR measurement report in an RRC container), an uplink (UL) RRC message transfer (e.g., in an RRC container), and/or the like. In some implementations, a measurement report may include information related to the set of beams (e.g., a connected beam, a set of surrounding beams, and/or the like), such as values of measurements. For example, a measurement report may identify a physical cell identifier (PCI), a synchronization signal and PBCH block (SSB) identifier (or index) (SSB ID), a channel state information reference signal (CSI-RS) identifier (CSI-RS ID), an RSRP value for the SSB and/or the CSI-RS, an RSRQ value for the SSB and/or the CSI-RS, an SINR value for the SSB and/or the CSI-RS, and/or the like.

In some implementations, UE1 through UE3, the BS, and/or devices of the network may provide the traffic via an interface. For example, UE1 through UE3 may provide the measurement reports to the 4G eNB via a long-term evolution (LTE) user (LTE-Uu) interface and the 4G eNB may then provide the measurement reports to the 5G gNB via an X2-C interface, directly to the 5G gNB via an F1-C interface, and/or the like. Additionally, or alternatively, and as another example, the BS and/or the devices of the network may provide the user data, the data delivery status message, and/or the assistance information data message via an F1 interface, an X2 interface, and/or the like.

In some implementations, UE1 through UE3, the BS, and/or the devices of the network may provide the traffic periodically (or based on other conditions), according to a schedule, based on receiving a request to provide the traffic, based on an event, based on a handover of UE1 through UE3, and/or the like. In some implementations, the traffic may be associated with a timestamp. For example, the timestamp may indicate a time at which the traffic was generated, a time at which the traffic was transmitted (e.g., to or from a user equipment or a base station), a time at which the traffic was received (e.g., at a user equipment or a base station), and/or the like. In some implementations, the traffic related to the communications may be associated with location information (e.g., global positioning system (GPS) coordinates, a beam identifier and/or a cell identifier, and/or the like) that identifies a location of a base station transmitting a beam, a location to which the beam is being transmitted, a location of a user equipment, and/or the like. In some implementations, information included in the traffic may be on a per-cell and/or a per-beam basis. For example, the information included in the traffic may be for one or more beams associated with one or more cells (e.g., a serving cell, a listed cell, a detected cell, and/or the like) associated with the BS, for a beam received by a UE (e.g., a beam associated with the cell), and/or the like.

Figure 1C:
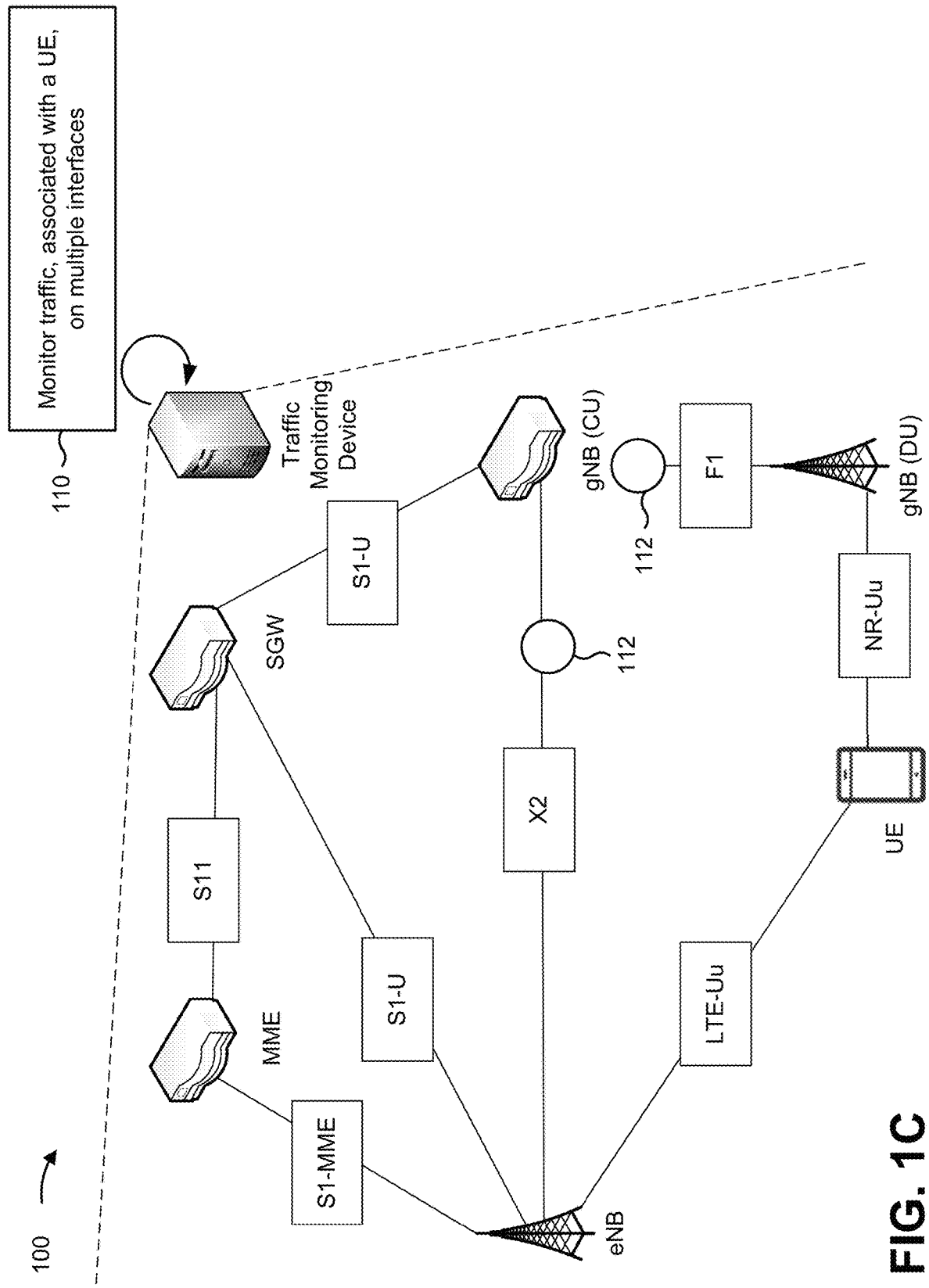

Turning to FIG. 1C, and as shown by reference number 110, a traffic monitoring device may monitor traffic, associated with a UE, on multiple interfaces of a network. For example, the multiple interfaces may include an F1 interface (e.g., an F1-C/U interface) between a 5G gNB distributed unit (5G gNB (DU)) and a 5G gNB central unit (5G gNB (CU)) (or a separate gNB-CU-control plane (CP) for an F1-C interface and gNB-CU-user plane (UP) for an F1-U interface, where the gNB-CU-CP and the gNB-CU-UP are connected via an E1 interface), an X2 interface (e.g., an X2-C/U interface) between a 4G eNB and a 5G gNB (CU), an S1-U interface between a 5G gNB (CU) and a serving gateway (SGW) or between the 4G eNB and the SGW, an S1-mobility management entity (MME) (S1-MME) interface between a 4G eNB and a MME of a 4G EPC, and/or the like.

In some implementations, the traffic monitoring device may monitor the traffic via a set of network probes 112 deployed on the multiple interfaces. For example, and as shown in FIG. 1C, a first network probe 112 may be deployed on an X2 interface between the 4G eNB and the 5G gNB, a second network probe 112 may be deployed on an F1 interface between a 5G gNB (DU) and the 5G gNB (CU), and/or the like. In some implementations, a set of network probes 112 may be deployed on an S1-U interface, an S11 interface, and/or the like (e.g., to monitor traffic for correlation across various interfaces). Additionally, or alternatively, the traffic may be included in a data feed from the BS, from a network exposure function (NEF) (e.g., that provides information related to network events via an Nnef interface), a network data analytics function (NWDAF) (e.g., that provides information related to network analytics via an Nnwdaf interface), and/or the like. In some implementations, the traffic monitoring device may use the traffic from the data feed to supplement information gathered from monitoring an interface, when data cannot be gathered from an interface, for processing and/or analysis as described herein, and/or the like. In some implementations, the traffic monitoring device may provide a result of processing traffic to an NWDAF so that the NWDAF can perform analytics on the result.

In some implementations, the traffic monitoring device may use a set of data feeds from a drive and/or walk test device (e.g., used in association with an MDT test), such as a beam scanner, an over-the-air radio analyzer, and/or a UE that generates beam measurements in device logs to supplement detection of interference of a beam. For example, a data feed may include timestamps, GPS coordinates, cell identifiers, beam identifiers, measurements such as SSB RSRP, SSB RSRQ, SSB SINR, CSI-RS RSRP, CSI-RS RSRQ, CSI-RS SINR, and/or the like. In some implementations, the traffic monitoring device may utilize a set of data feeds from the drive and/or walk test device, a set of trace port feeds from a BS, a set of operation and support system (OSS) feeds, a set of NEF application programming interface (API) events, and/or the like to detect an interference of a beam when the UE is not connected to a BS, when there is no coverage for the location of the UE, to improve an accuracy of detecting an interference and/or determining a location of the interference, and/or the like such that the traffic monitoring device cannot monitor traffic via one of the interfaces described herein.

In some implementations, the traffic may include information related to a UE (e.g., UE1 through UE3), a set of beams associated with the UE, and/or the like. For example, and for the S1-MME interface described above, the traffic may include a subscriber identifier, such as an international mobile subscriber identity (IMSI), an equipment identifier, such as an international mobile equipment identity (IMEI), an IMEI with a software version number (IMEISV), and/or the like. In some implementations, the traffic monitoring device may use this information to correlate traffic with a UE (e.g., via an IMSI, an IMEI, an IMEISV, and/or the like), as described elsewhere herein. As another example, and for the X2-C interface, the traffic (e.g., a signaling radio bearer 1 (SRB1) or a split bearer) may include per cell and/or per beam power measurements (e.g., RSRP) and/or quality measurements (e.g., RSRQ, SINR, and/or the like). In some implementations, the traffic monitoring device may use this information to identify an SSB ID, a CSI-RS ID, an RSRP for the SSB and/or the CSI-RS, an RSRQ for the SSB and/or the CSI-RS, an SINR for the SSB and/or the CSI-RS, and/or the like. In some implementations, this information may be included in an X2-application protocol (X2-AP) message, such as an RRC transfer (e.g., an NR measurement report in an RRC container). Similarly, and as an example for the F1-C interface, the traffic (e.g., a signaling radio bearer 3 (SRB3) or a split bearer) may include similar information. Additionally, or alternatively, this information may be included in an F1-AP UL RRC message transfer in an RRC container.

As another example, for an S1-U interface, an X2-U interface, an F1-U interface, and/or a next generation (NG)-U/N3 interface, the traffic may include user plane packets (e.g., user data) and/or metrics related to the user plane packets. For example, the traffic may include user plane packets to and/or from a UE, information that identifies a quantity of user plane packets transmitted from a UE, a quantity of dropped user plane packets, and/or the like. In some implementations, the traffic monitoring device may use this information to determine throughput of a UE, to perform (or assist with performing) deep packet inspection, to perform (or assist with performing) flow control and/or a flow control analysis, to perform (or assist with performing) buffer management analysis, and/or the like.

In some implementations, the traffic monitoring device may monitor the traffic in real-time, based on receiving a copy of the traffic from one or more of the other devices associated with implementation 100, based on receiving a copy of the traffic from an application installed on one or more of the other devices associated with implementation 100, based on requesting the traffic, and/or the like. In some implementations, the traffic monitoring device may not receive contents of the traffic (e.g., a body of a communication), but rather may receive metadata associated with the traffic (e.g., information that can be used to identify a source of the traffic, a destination of the traffic, a network services subscriber associated with the traffic, and/or the like). This maintains a privacy of the traffic that could otherwise be compromised via receipt of contents of the traffic.

In some implementations, the traffic may be ciphered (e.g., encrypted, protected, and/or the like). For example, the traffic may be ciphered utilizing an encryption algorithm, such as a 5G/New Radio (NR) encryption algorithm (NEA) by a gNB utilizing a secondary node key (S-KgNB), or an evolved packet system (EPS) encryption algorithm (EEA) by an eNB utilizing a master node key (KeNB). In some implementations, the traffic monitoring device may not monitor traffic between the UE and a set of base stations. For example, the traffic monitoring device may not monitor traffic between the UE and the eNB (e.g., on the LTE-Uu interface) and/or between the UE and the gNB (DU) (e.g., on the NR-Uu interface). In this way, the traffic monitoring device does not monitor traffic directly to and/or from the UE. This reduces or eliminates interruptions to communications between the UE and a base station that could occur if the traffic monitoring device monitored traffic directly to and/or from the UE. In addition, this improves privacy of the traffic. In some implementations, traffic on different interfaces may utilize different identifiers to identify the UE, an account associated with the UE and/or the traffic, a subscriber associated with the traffic and/or the UE, and/or the like. In some implementations, some of the identifiers used on the different interfaces may not uniquely identify the UE, the account, the subscriber, and/or the like.

Figure 1D:
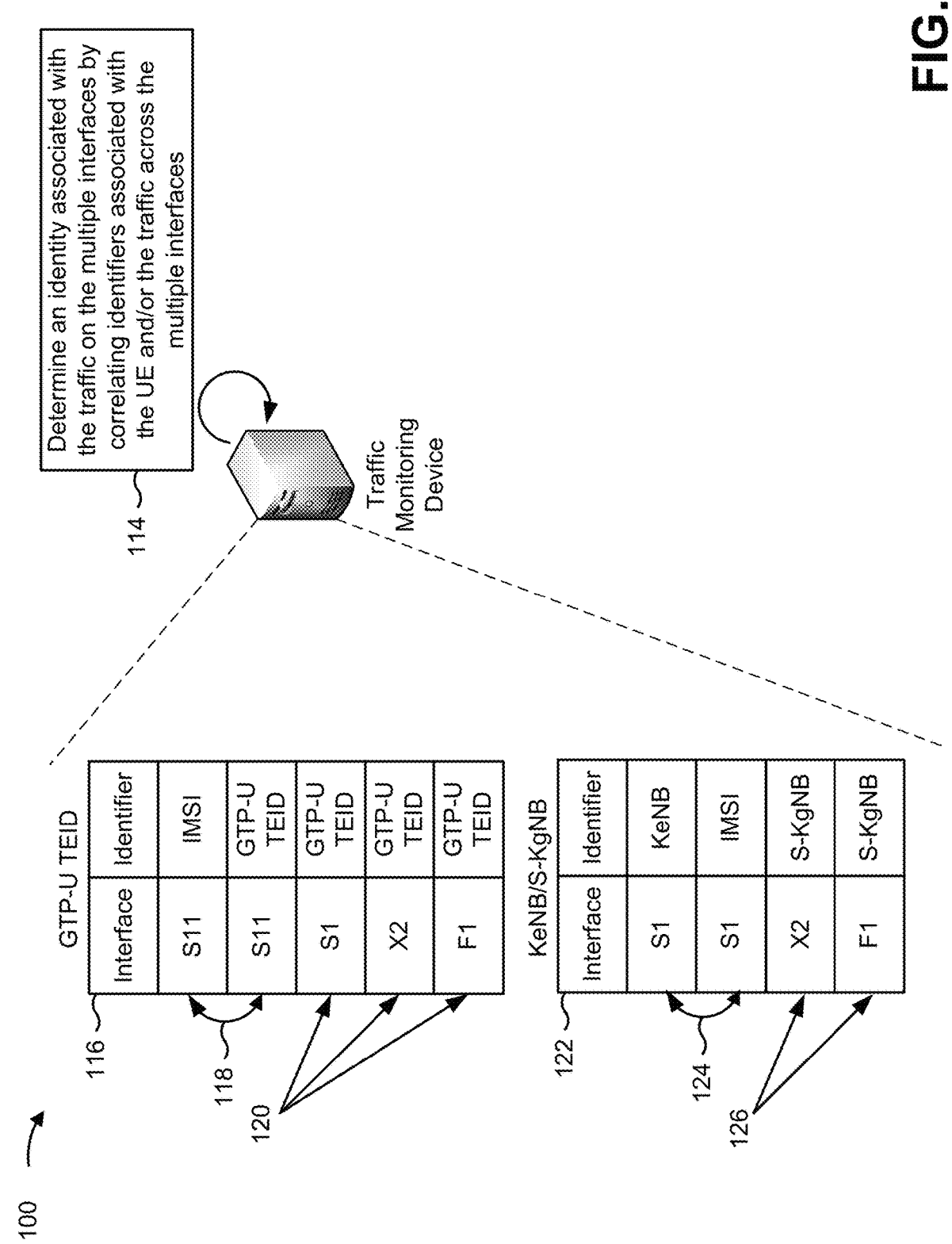

Turning to FIG. 1D, and as shown by reference number 114, the traffic monitoring device may determine an identity associated with the traffic on the multiple interfaces by correlating identifiers associated with the UE and/or the traffic across the multiple interfaces. For example, the traffic monitoring device may correlate different identifiers used on different interfaces in association with the traffic across the multiple interfaces. Continuing with the previous example, a network may utilize a first identifier to identify the UE on a first interface, and may utilize a second identifier to identify the UE on a second interface, and the traffic monitoring device may correlate the first identifier and the second identifier so that the traffic can be associated with the UE, an account, a subscriber, and/or the like regardless of the identifier utilized. In some implementations, an identity may uniquely identify the UE, a subscriber associated with the UE and/or the traffic, an account associated with the UE and/or the traffic, and/or the like. For example, the identity may be based on an IMSI, an IMEI, and/or the like.

As shown by reference number 116, the traffic monitoring device may determine an identity based on a general packet radio service (GPRS) tunneling protocol user plane (GTP-U) tunnel endpoint identifier (TEID) (GTP-U TEID). For example, and as shown by reference number 118, the traffic monitoring device may correlate an IMSI and a GTP-U TEID on an S11 interface (e.g., both the IMSI and the GTP-U TEID may be used in association with traffic on the S11 interface). Continuing with the previous example, and as described in more detail elsewhere herein, signaling on the S11 interface may utilize both the IMSI and the GTP-U TEID in association with establishing a communications session for the UE. In this way, the traffic monitoring device may map traffic that utilizes a GTP-U TEID to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the GTP-U TEID and the IMSI.

As shown by reference number 120, based on correlating the GTP-U TEID and the IMSI on the S1 interface, the traffic monitoring device can identify an identity for traffic on one or more other interfaces. For example, the traffic monitoring device can map traffic on the S1 interface, the X2 interface, and/or the F1 interface to the same IMSI that was correlated with the GTP-U IEID on the S11 interface. In this way, the traffic monitoring device can determine an identity associated with traffic across multiple interfaces utilizing a GTP-U TEID (e.g., utilizing information that identifies a mapping of the GTP-U TEID and an IMSI).

As shown by reference number 122, the traffic monitoring device may determine an identity based on KeNB and a S-KgNB. For example, and as shown by reference number 124, the traffic monitoring device may correlate an IMSI and a KeNB on an S1 interface (e.g., both the IMSI and the KeNB may be used in association with traffic on the S1 interface). In this way, the traffic monitoring device may map traffic that utilizes a KeNB to an IMSI (e.g., to a UE, to an account, to a subscriber, and/or the like associated with the IMSI). In some implementations, the traffic monitoring device may store information in a data structure, in memory resources of the traffic monitoring device, and/or the like, that identifies a mapping of the KeNB and the IMSI.

As shown by reference number 126, the traffic monitoring device may utilize an S-KgNB to correlate traffic on one or more other interfaces with the IMSI. For example, an S-KgNB may be derived from a KeNB (e.g., via a known process). In some implementations, the traffic monitoring device may determine the S-KgNB that is expected on the one or more other interfaces based on the KeNB identified on the S1 interface. In some implementations, based on determining the S-KgNB, the traffic monitoring device may identify traffic that utilizes the S-KgNB as being associated with the IMSI. In this way, the traffic monitoring device may correlate traffic across multiple interfaces utilizing a KeNB and an S-KgNB.

In some implementations, after determining the identity associated with the traffic, the traffic monitoring device may associate the traffic with a particular UE (e.g., may associate user data, a data delivery status message, an assistance information data message, and/or a measurement report with a UE). For example, the traffic monitoring device may associate traffic with a particular UE by matching an identifier associated with the traffic that identifies a source UE of the traffic and a set of identifiers associated with the particular UE. In some implementations, after associating traffic with a particular UE, the traffic monitoring device may identify, using information included in the traffic, values for parameters included in the traffic, a connected beam that the UE is using (e.g., based on a beam identifier for the connected beam), a set of surrounding beams that the UE is receiving (e.g., based on a respective beam identifier for the set of surrounding beams), respective sets of measurements for the connected beam and/or the set of surrounding beams, a trend in values for the respective sets of measurements, whether the values for the respective sets of measurements satisfy a threshold, and/or the like.

As a specific example related to UE1, the traffic monitoring device may determine that UE1 is using beam 63 as a connected beam, may determine that UE1 is receiving beams 54, 55, and 64, as surrounding beams, may determine that beam 63 is experiencing an increasing SINR value over time (e.g., based on UE1 moving toward the BS), that an RSRP and/or an RSRQ value of beams 54 and 55 are improving over time while the values for the same measurements for beams 63 and 64 are degrading over time (e.g., based on UE1 moving toward the BS), and/or the like based on associating a set of measurement reports with UE1. Additionally, or alternatively, and for UE1, the traffic monitoring device may determine that a throughput of user data received by UE1 satisfies a threshold, may determine that a round trip time of messages included in the traffic satisfies a threshold, may determine that a radio quality index satisfies a threshold, and/or the like.

Additionally, or alternatively, and as a specific example related to UE2, the traffic monitoring device may determine that UE2 is using beam 66 as a connected beam with values for RSRP and/or RSRQ that are below a threshold and/or that are abnormal, may determine that UE2 is failing to use a connected beam, may determine that UE2 is receiving beams 56, 58, 65, and 67 as surrounding beams (or is using one of these beams as a connected beam despite having RSRP, RSRQ, and/or SINR values that fail to satisfy a threshold), may determine that UE2 is failing to receive beam 57 as a surrounding beam (e.g., that beam 57 has an RSRP and/or an RSRQ that fail to satisfy a threshold, that the values of these measurements are abnormal relative to other surrounding beams, and/or the like), and/or the like based on associating a set of measurement reports with UE2. Additionally, or alternatively, and for UE2, the traffic monitoring device may determine that interference to beam 66 occurred temporarily or periodically (e.g., as determined from traffic for multiple UEs over time or from traffic for UE2 over time), that a throughput of traffic from UE2 and/or a round trip time of traffic associated with UE2 fails to satisfy a threshold, that a radio quality index associated with a communication link between UE2 and the BS fails to satisfy a threshold, and/or the like.

Additionally, or alternatively, and as a specific example related to UE3, the traffic monitoring device may determine that UE3 is using beam 70 as a connected beam, may determine that UE3 is receiving beams 60, 61, 68, 69, and 71 as surrounding beams but that values of RSRP, RSRQ, SINR, and/or the like for beam 68 satisfy a threshold indicating that beam 68 is an unexpected surrounding beam (e.g., due to a beam reflection of beam 68), may determine that SINR values for beams 69, and/or 70 satisfy a threshold (e.g., based on interference from the beam reflection of beam 68), and/or the like based on associating a set of measurement reports with UE3. Additionally, or alternatively, and for UE3, the traffic monitoring device may determine that a beam reflection of beam 68 occurred temporarily or periodically (e.g., as determined from traffic for multiple UEs over time or from traffic for UE3 over time), that a throughput of traffic from UE3 and/or a round trip time of traffic associated with UE3 fails to satisfy a threshold, that a radio quality index associated with a communication link between UE3 and the BS fails to satisfy a threshold, and/or the like.

As described below, the traffic monitoring device can use this information to detect a temporary interference to a beam, to determine a user experience of a user of a UE, to determine a quality of a communications link between the UE and a BS, and/or the like.

Figure 1E:
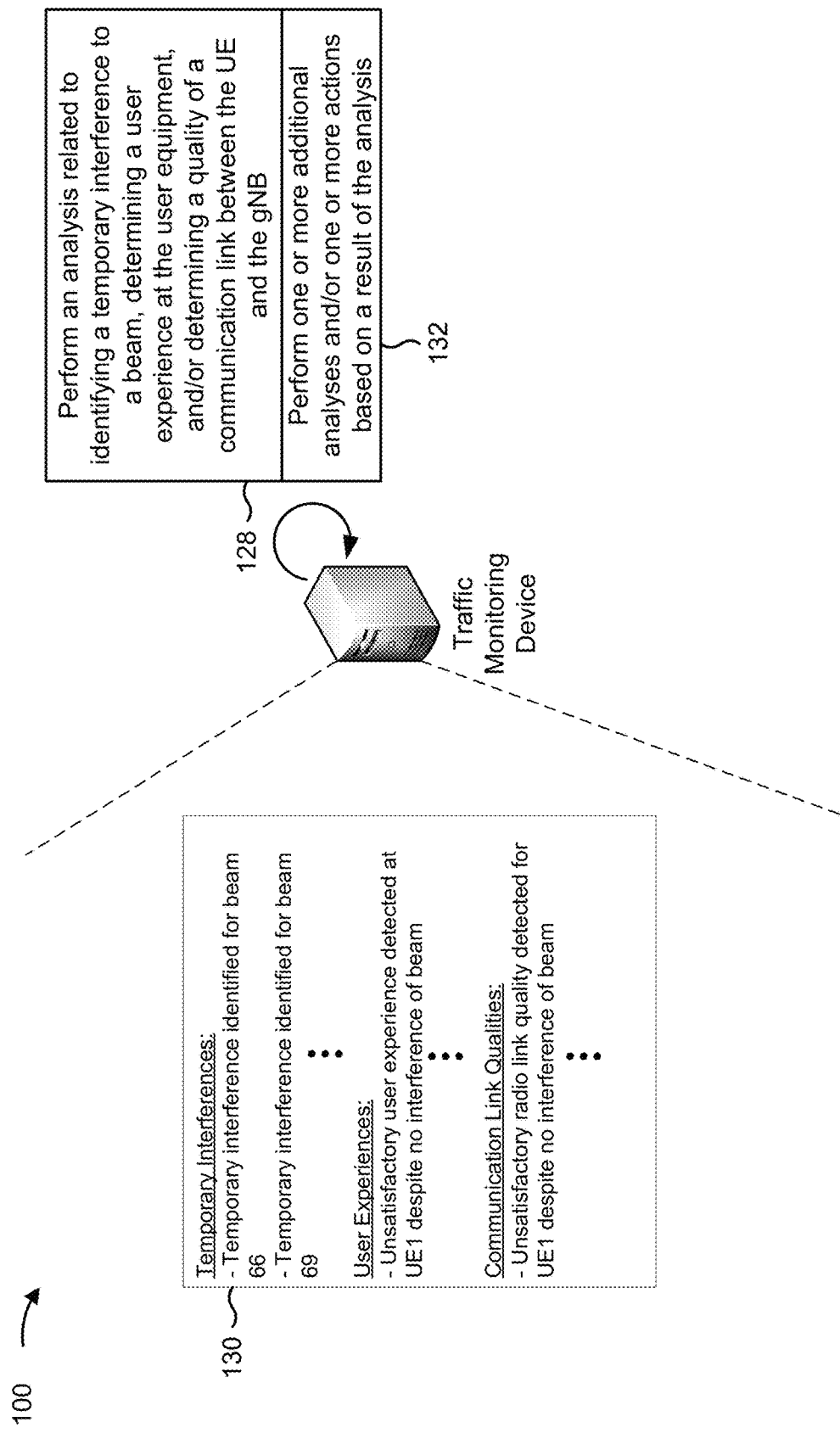

Turning to FIG. 1E, and as shown by reference number 128, the traffic monitoring device may perform an analysis related to identifying a temporary interference to a beam, determining a user experience at the user equipment, and/or determining a quality of a communication link between the UE and the gNB. In some implementations, the traffic monitoring device may perform the analysis after monitoring the traffic (e.g., for a threshold amount of time), after determining the identity associated with the traffic, based on receiving input from a user of the traffic monitoring device to perform the analysis, and/or the like.

In some implementations, the traffic monitoring device may perform a first analysis related to identifying a temporary interference of a beam from a BS. For example, the traffic monitoring device may perform the first analysis of measurements, parameters, and/or the like identified from monitoring the traffic to identify a temporary interference of a beam from a BS. In some implementations, the traffic monitoring device may identify a temporary interference of a beam by performing the first analysis across various times. For example, the traffic monitoring device may determine that the values for parameters and/or measurements are different at the different times, that the values satisfy a threshold at one time but fail to satisfy the threshold at another time, that the values are present at one time but are missing at another time, that the values have a pattern of being different over time, and/or the like, and may identify a temporary interference of the beam based on the difference in values over time. Additionally, or alternatively, and as another example, the traffic monitoring device may identify a temporary interference (e.g., that causes a beam reflection) by identifying a pattern of an unexpected connected beam associated with the UE, a pattern of an unexpected surrounding beam associated with the UE, and/or the like.

As a specific example, such as when the temporary interference is caused by a bus on a bus route, the traffic monitoring device may identify a pattern of different values at an interval (e.g., that values may fail to satisfy a threshold at a 10 minute, 30 minute, 60 minute, etc. interval), and may identify the temporary blockage based on identifying the pattern of different values at the interval. Additionally, or alternatively, and as another specific example, the traffic monitoring device may determine that the UE is receiving an unexpected connected beam and/or an unexpected surrounding beam at an interval, periodically, and/or the like, and may identify a temporary interference based on the UE receiving the unexpected connected beam and/or the unexpected surrounding beam at the interval. Additionally, or alternatively, and as another specific example, the traffic monitoring device may determine that an interference of a beam is occurring based on detecting an indication of a detected communication link outage from the traffic, and may detect removal of the temporary interface by detecting a communication link resume from the traffic.

In some implementations, the traffic monitoring device may perform a second analysis related to determining the user experience of the user of the UE. For example, the traffic monitoring device may determine that values for measurements fail to satisfy a threshold at a particular time, are different from other UEs (e.g., at a same location, at different times at the same location, and/or the like), and/or the like, and may determine that the UE is associated with an unsatisfactory user experience. Continuing with the previous example, the traffic monitoring device may determine that a throughput of a portion of the traffic exchanged between the UE and the BS fails to satisfy a threshold, that a round trip time associated with the portion of traffic fails to satisfy a threshold, and/or the like and may determine that the UE is associated with an unsatisfactory user experience.

In some implementations, the traffic monitoring device may perform a third analysis related to determining a quality of a communication link between the UE and the BS. For example, the traffic monitoring device may perform the third analysis based on values for a set of measurements, values for a set of parameters, and/or the like. In some implementations, the traffic monitoring device may perform the third analysis based on a set of quality measurements of a set of beams associated with the UE (e.g., SINR, RSRQ, and/or the like), a set of power measurements of a set of beams associated with the UE (e.g., RSRP, and/or the like), and/or the like. For example, the traffic monitoring device may determine that the set of quality measurements and/or the set of power measurements for a beam fail to satisfy a threshold compared to a previous time, in a pattern over time, and/or the like, and may determine a quality of a communications link between the UE and the BS fails to have a threshold quality based on the set of quality measurements and/or the set of power measurements failing to satisfy a threshold compared to a previous time, in a pattern over time, and/or the like.

Additionally, or alternatively, and as another example, the traffic monitoring device may determine that a value of a radio quality index included in an assistance information data message fails to satisfy a threshold, is not an expected value, and/or the like, and may determine a quality of a communication link associated with the radio quality index from the value, may determine that the quality of the communication link fails to satisfy a threshold, may determine that the quality of the communication link deviates from an expected quality, and/or the like.

Reference number 130 shows examples of temporary interferences, user experiences, and/or communication link qualities that the traffic monitoring device may have determined for UE1 through UE3. For example, the traffic monitoring device may identify temporary interferences for beams 66 and 69. Continuing with the previous example, the temporary interferences may cause UE2 to fail to receive beam 66 and may cause UE3 to receive a beam reflection of beam 69, as described above. Additionally, or alternatively, and as another example, the traffic monitoring device may determine that UE1 is associated with an unsatisfactory user experience despite no interference of beams associated with UE1 (or that are expected to be associated with UE1). Continuing with the previous example, the traffic monitoring device may determine that UE1 is additionally associated with an unsatisfactory communication link quality despite no interference of beams associated with UE1 (or that are expected to be associated with UE1). Continuing still with the previous example, the traffic monitoring device may determine that the unsatisfactory quality of the communication link may be a cause of the unsatisfactory user experience (e.g., based on occurring at a same time, at a same location, for a same UE, in a same pattern, and/or the like, as the unsatisfactory user experience).

In some implementations, the traffic monitoring device may determine a geographic location of the UE. For example, the traffic monitoring device may determine a geographic location of the UE after identifying a temporary interference, after determining a user experience of a user of the UE, after determining a quality of a communication link, based on receiving input from a user of the traffic monitoring device, to identify a location of a temporary interference, to identify a location of a particular user experience, to identify a location of a particular quality of a communication link, and/or the like.

In some implementations, the traffic monitoring device may determine a geographic location of the UE based on mapping a cell identifier and/or a beam identifier associated with the UE to specific GPS coordinates (or GPS area) via a de-referencing and/or lookup to reference data that identifies a mapping between cell identifiers and/or beam identifiers and GPS coordinates. For example, the traffic monitoring device may determine a geographic location of the UE (e.g., UE1 through UE3) after associating a set of measurement reports with the UE (e.g., using cell identifiers and/or beam identifiers with associated measurements for SSBs, CSI-RSs, and/or the like). In some implementations, the traffic monitoring device may determine a geographic location periodically, according to a schedule, in real-time (or near real-time), based on receiving a request from the UE to perform a location-based service for the UE, based on receiving a request from a network provider to perform a location-based service for the UE and/or with respect to multiple UEs, and/or the like.

In some implementations, the traffic monitoring device may use various information included in the traffic, various information related to a beam configuration of a cell, and/or the like to determine the geographic location of the UE. For example, the traffic monitoring device may use a cell identifier (cell ID) and/or a beam identifier (beam ID) from a data delivery status message, a measurement report, an assistance information data message, and/or the like in association with determining the geographic location of the UE. Continuing with the previous example, the traffic monitoring device may use the cell ID to identify a cell in which the UE is located, and may use pre-configured location information of a BS associated with the cell (e.g., reference data), such as a geographic location, a set of coordinates, and/or the like, to identify a location of the cell. Continuing still with the previous example, the traffic monitoring device may use the beam ID to identify a particular location of the UE in a cell based on pre-configured cell and/or beam configuration information of the cell (e.g., information that identifies a configuration of beams of a cell and/or cells associated with a BS), based on information that identifies a distance of a beam from the BS, based on information that identifies a direction of a beam from the BS (e.g., in compass degrees, in cardinal directions, and/or the like), and/or the like.

As a particular example, with regard to UE1, the traffic monitoring device may determine that UE1 is located within a particular cell, which is associated with a BS at a particular location. To improve an accuracy of the determination of the location of UE1, the traffic monitoring device may further determine that within the particular cell, UE1 is using beam 63 as a connected beam, and that beam 63 is located approximately 100 meters (m) from the BS in a particular direction. In some implementations, the traffic monitoring device may further refine the accuracy of the location of UE1 based on values of measurements for beam 63. For example, the traffic monitoring device may determine whether UE1 is located relatively closer or further from the BS within beam 63 based on a value of an RSRP, an RSRQ, a SINR, and/or the like associated with beam 63. Additionally, or alternatively, and continuing with the previous example, the traffic monitoring device may refine an accuracy of the location of UE1 within beam 63 based on values for the same measurements of surrounding beams received by UE1 (e.g., a value that satisfies a threshold may indicate that UE1 is further or closer to a particular surrounding beam within beam 63). In some implementations, the traffic monitoring device may determine a location of UE2 and UE3 in a similar manner using similar information.

In some implementations, a BS may transmit a beam in a horizontal plane and/or a vertical plane. For example, the BS may transmit a beam in a particular x-axis direction or z-axis direction in a horizontal plane and/or may transmit the beam in a particular y-axis direction (e.g., such as when a beam is transmitted to a particular floor of a building above a ground floor or at an elevated angle from the BS). Some implementations described herein facilitate geolocation of a UE in a horizontal plane and/or a vertical plane. For example, reference data described herein may identify GPS coordinates of a location to which a beam is transmitted, an angle of elevation at which the beam is transmitted, an elevation to which a beam is transmitted, and/or the like, and the UE may use this information, in combination with cell identifiers and/or beam identifiers, to identify a GPS location of the UE, to determine an elevation of the UE at the GPS location, and/or the like. In this way, some implementations described herein facilitate three-dimensional geolocation of a UE (e.g., in a horizontal plane and/or a vertical plane).

In this way, the traffic monitoring device may correlate measurements (e.g., coverage and/or user-centric measurements) with reference data (e.g., cell site global positioning system (GPS) coordinates, a configuration of beams of a cell, phases and/or amplitudes of beams of a cell, estimated and/or projected path loss distance for a beam, and/or the like) to determine a location of a UE, such as within one meter of an actual location of the UE, in some cases, and/or more accurately than using GPS.

In some implementations, the traffic monitoring device may determine a geographic location of an issue with communications of a UE after determining a geographic location of the UE. For example, the traffic monitoring device may determine that a temporary interference is at a particular location based on UEs experiencing a pattern of interference at the location over time (e.g., a pattern of missing connected beams for the UEs, a pattern of missing surrounding beams for the UEs, a pattern of measurements that fail to satisfy a threshold, and/or the like). Additionally, or alternatively, and as another example, the traffic monitoring device may determine that a particular location is associated with a particular user experience and/or a particular communication link quality based on UEs being associated with the particular user experience and/or the particular communication link quality at the particular location.

As shown by reference number 132, the traffic monitoring device may perform one or more additional analyses and/or one or more actions based on a result of the analysis. For example, the traffic monitoring device may perform one or more additional analyses and/or one or more actions related to the one or more analyses after determining a geographic location of the UE, after determining a location of an issue associated with communications of the UE, and/or the like.

In some implementations, the traffic monitoring device may determine a movement and/or a direction of the movement of the UE. For example, the traffic monitoring device may identify a change in a connected beam used by the UE and/or a set of surrounding beams received by the UE (e.g., which may indicate a movement or a direction of movement based on information that identifies a beam configuration of a cell), a change in a respective set of measurements associated with the connected beam or the set of overage beams (e.g., decreasing values over time may indicate that the UE is moving away from the BS and/or from a particular beam, increasing values over time may indicate that the UE is moving toward the BS and/or a particular beam, and/or the like), and/or the like.

In some implementations, the traffic monitoring device may generate a cell-specific model for coverage of beams associated with a cell, which was trained, via one or more machine learning techniques, on information identifying historical measurements of beams associated with the cell and locations of various UEs in the cell, various data feeds described herein, a walk or drive test performed using a beam scanner, and/or the like. For example, the model may be trained during normal use of the cell and/or may have been trained based on results of field testing by a technician (e.g., where an actual location of a UE can be used to correct errors in location determination by the traffic monitoring device). In some implementations, the traffic monitoring device may use the model to process traffic to predict the location of the UE based on the values of measurements and/or parameters included in the traffic, to improve an accuracy of a location determination based on a beam identifier, and/or the like.

In some implementations, the traffic monitoring device may input a result of one or more analyses into a machine learning model that has been trained to identify issues related to communications between a UE and a BS. For example, the machine learning model may output information that identifies an occurrence of a temporary interference of a beam, a location of the temporary interference, a predicted user experience for a user of a user equipment, a predicted quality of a communication link, and/or the like.

In some implementations, the traffic monitoring device may correlate analyses across multiple UEs to identify a location of a physical object causing a temporary interference, thereby providing an estimation of real-world topography. For example, different UEs at different locations may be impacted in different ways by a temporary interference. Continuing with the previous example, a temporary interference between a BS and a first UE may prevent the first UE from receiving one or more beams, but may cause a second UE, between the temporary interference and the BS, to receive a beam reflection of one or more beams in an unexpected manner. Continuing still with the previous example, the traffic monitoring device may use this information to identify a location of the temporary interference (e.g., by triangulating beam interferences and beam reflections to a particular location, by using information that identifies a configuration of beams of a cell associated with the first UE and the second UE, and/or the like).

In some implementations, the traffic monitoring device may correlate the estimation of real-world topography with a virtual map to identify objects that are likely causing a beam interference, a beam reflection, and/or the like (e.g., by plotting the estimated topography on the virtual map using locations of the UE determined above, using pre-configured locations of the BS, and/or the like). For example, the traffic monitoring device may determine that a temporary interference is located on a road and may determine that traffic on the road is a likely cause of the temporary interference, may determine that a temporary interference is located at a fair ground and may determine that a temporary structure, such as a tent, a carnival ride, and/or the like, is a likely cause of the temporary interference, and/or the like. This reduces or eliminates a need to deploy a technician to a physical location to identify a cause of a temporary interference, a beam reflection, and/or the like, thereby conserving time, fuel, costs, and/or the like associated with deploying the technician. In addition, this facilitates prioritization of interferences to be addressed by a technician. For example, the traffic monitoring device may prioritize non-temporary interferences higher relative to temporary interferences (e.g., due to a potentially longer impact of the non-temporary interferences), may prioritize temporary interferences higher relative to non-temporary interferences (e.g., due to an increased difficulty of addressing the temporary interferences), and/or the like. In some implementations, the traffic monitoring device may cause a technician to be dispatched to a location of a temporary interference, an unsatisfactory user experience, an unsatisfactory quality of a communication link, and/or the like to address the temporary interference, the unsatisfactory user experience, and/or the unsatisfactory quality of the communication link.

In some implementations, the UE may determine a shape and/or coverage of a beam of a cell. For example, by aggregating values of measurements from UEs in different locations, the traffic monitoring device may be capable of determining a coverage area of a beam (e.g., based on the beam being received by UEs in different locations), a power and/or quality of the beam within the coverage area of the beam (e.g., based on RSRP and/or RSRQ values from measurement reports of different UEs receiving the beam), areas of interference with respect to coverage beams and/or user-dedicated data beams (e.g., based on SINR values from measurement reports of different UEs receiving the beam), and/or the like.

In some implementations, the traffic monitoring device may determine a performance of communications of the UE and/or a network and may identify an issue with the performance. For example, the traffic monitoring device may determine throughput, jitter, latency, dropped packets, and/or the like based on monitoring traffic via the network probes 112. In some implementations, the traffic monitoring device may perform a trouble shooting analysis with regard to the performance of the communications and/or an issue with the performance. For example, if the traffic monitoring device identifies an issue related to the performance of the communications of a UE (or if a user of the UE reports an issue), then the traffic monitoring device may determine whether a source of the issue is a network (e.g., radio coverage issues at a location, beam coverage at a location, management of beams, and/or the like), is the UE (or an application associated with the UE when application session data is available to the traffic monitoring device), and/or the like. Continuing with the previous example, the traffic monitoring device may process measurement reports for the UE and/or other UEs proximate to the UE, to determine whether a beam coverage is a possible cause of the issue (e.g., based on determining whether values of measurements fail to satisfy a threshold for the UE and/or one or more other UEs), whether the UE is the source of the issue (e.g., based on determining that the values for the measurements satisfy a threshold, based on determining that traffic from the UE already includes an issue when received by the network, and/or the like), and/or the like. In this way, the traffic monitoring device may perform troubleshooting related to addressing an issue related to a temporary interference, a user experience, and/or a quality of a communication link.

In some implementations, the traffic monitoring device may generate a map based on determining a location for a UE, a temporary interference, a user experience, a quality of a communication link, and/or the like. For example, the traffic monitoring device may generate a map of temporary interferences and/or a heat map of user experiences and/or qualities of communication links (e.g., by overlaying determined locations related to the temporary interferences, the user experiences, and/or the qualities of the communication links onto a virtual map). In some implementations, the map may include an identifier (e.g., an icon) that identifies a location of a UE, of a temporary interference, of a detected unsatisfactory user experience, of a detected unsatisfactory quality of a communication link, and/or the like. In some implementations, the traffic monitoring device and/or a user of the traffic monitoring device may use the coverage map and/or a capacity map (e.g., that is generated based on monitoring an amount of traffic across interfaces of a network) for network planning, network cell site prediction (e.g., to predict and/or determine a location for a new cell site such as by utilizing a network cell site prediction system and/or a simulation tool that utilizes modeling and field and/or assurance system test results). In some implementations, the traffic monitoring device may provide a map for display via a display associated with a UE (e.g., associated with a network technician, a customer, and/or the like).

In some implementations, the traffic monitoring device and/or another device may use a generated map to perform an analysis of a set of beams associated with a cell (e.g., a set of coverage beams and/or a set of user-dedicated data beams) and/or to generate recommendations regarding reconfiguration of coverage of the set of beams. For example, the traffic monitoring device and/or the other device may recommend that physical obstructions be removed, that additional BSs be installed to compensate for a physical obstruction and/or a beam reflection, and/or the like. In some implementations, data related to the generated map may be provided to a third party and/or used by an owner of the traffic monitoring device for network beam-based optimization (e.g., by providing the data to an application and/or a system, such as a customer experience system, a network planning optimization system, a network cell site prediction system, a network automation system, a big data analytics system, and/or the like).

In some implementations, the traffic monitoring device and/or another device may provide location-based services to a UE. For example, the traffic monitoring device and/or another device may provide information for display related to the location of the UE (e.g., restaurants located in the vicinity of the UE, historical information regarding the location, and/or the like). Additionally, or alternatively, and as another example, the traffic monitoring device and/or the other device may provide a set of directions, from the UE to a destination, input into a navigation application of the UE for display. Additionally, or alternatively, and as another example, the traffic monitoring device and/or the other device may provide the location of the UE to an emergency dispatcher.

In some implementations, the traffic monitoring device may use the location determined in the manner described herein to improve an accuracy of a location determined using another technique. For example, the traffic monitoring device may improve an accuracy of a location of the UE determined using a global positioning system (GPS) by correcting the determined location, averaging the location from the GPS with the location determined in the manner described herein, weighting locations from different techniques, and/or the like.

In some implementations, the traffic monitoring device may perform the analyses and/or actions described herein in real-time or near real-time (e.g., as the traffic monitoring device monitors a stream of data associated with a UE). Additionally, or alternatively, the traffic monitoring device may perform the analyses and/or actions described herein in a self-learning manner. For example, as new data is received, and/or as results of the analyses and/or actions are corrected by an operator of the traffic monitoring device, the traffic monitoring device may update current and/or future analyses and/or actions. Additionally, or alternatively, the traffic monitoring device may perform the analyses described herein in a time-series manner. For example, the traffic monitoring device may generate time-series maps, may perform topology estimations, and/or the like, over time. Additionally, or alternatively, the traffic monitoring device may provide data related to an analysis described herein as a data feed to an NWDAF, to a server device, to a client device, and/or to another destination.

In this way, the traffic monitoring device may identify a temporary interference to a beam, may determine a user experience of a user of a UE, and/or may determine a quality of a communication link. In addition, in this way, the traffic monitoring device may perform an action to address the temporary interference, the user experience, and/or the quality of the communication link. This improves communications between the UE and a BS that would otherwise be impacted by temporary interference, by a poor user experience, and/or by a poor quality communication link. In addition, this conserves processing resources that would otherwise be consumed as a result of poor communications between the UE and the BS. Further, this facilitates detection of issues associated with communications between the UE and the BS that could not be previously detected.

As indicated above, FIGS. 1A-1E are provided merely as one or more examples. Other examples may differ from what is described with regard to FIGS. 1A-1E. The implementations described herein are applicable to a non-standalone architecture (NSA) with dual connectivity (EN-DC) deployment, a standalone architecture (SA), and/or the like. Although FIGS. 1A-1E are described in the context of a temporary interference, the implementations apply equally to a permanent interference (e.g., a building, a tree, and/or the like). For example, a traffic monitoring device may use one or more of the techniques described herein to detect a permanent interference based on failing to receive a beam at a location for a threshold amount of time, to detect a permanent interference based on receiving a beam reflection for a threshold amount of time, to determine a location of the permanent interference, and/or the like (e.g., using information that identifies a configuration of beams for a base station).

In addition, although particular identifiers are used as examples herein, the implementations apply equally to other identifiers, such as a subscription permanent identifier (SUPI) (e.g., rather than an IMSI), a permanent equipment identifier (PEI) (e.g., rather than an IMEI), a subscription concealed identifier (SUCI), network slice selection assistance information (NSSAI), single NSSAI (S-NSSAI), a slice/service type (SST) identifier, a slice differentiator (SD), a network slice instance identifier (NSI ID), a quality of service class identifier (QCI), a 5G quality of service identifier (5QI), and/or the like. In some implementations, these identifiers may be associated with different services (e.g., a web-browsing service, a virtual reality (VR)/augmented reality (AR) service, a telephone service, a messaging service, an Internet of things (IoT) service, and/or the like), and the traffic monitoring device may be capable of using these indenters to identify interferences (or locations and/or severities thereof) to different services, as different interferences may impact different services to different extents.

Further, the implementations described herein may be used to aggregate information for a geographic area that is associated with multiple cells and/or BSs. For example, a traffic monitoring device may aggregate information that identifies a user experience, a quality of a communication link, and/or the like for a geographic area, based on processing traffic associated with multiple cells in the manner described herein.

Figure 2A:
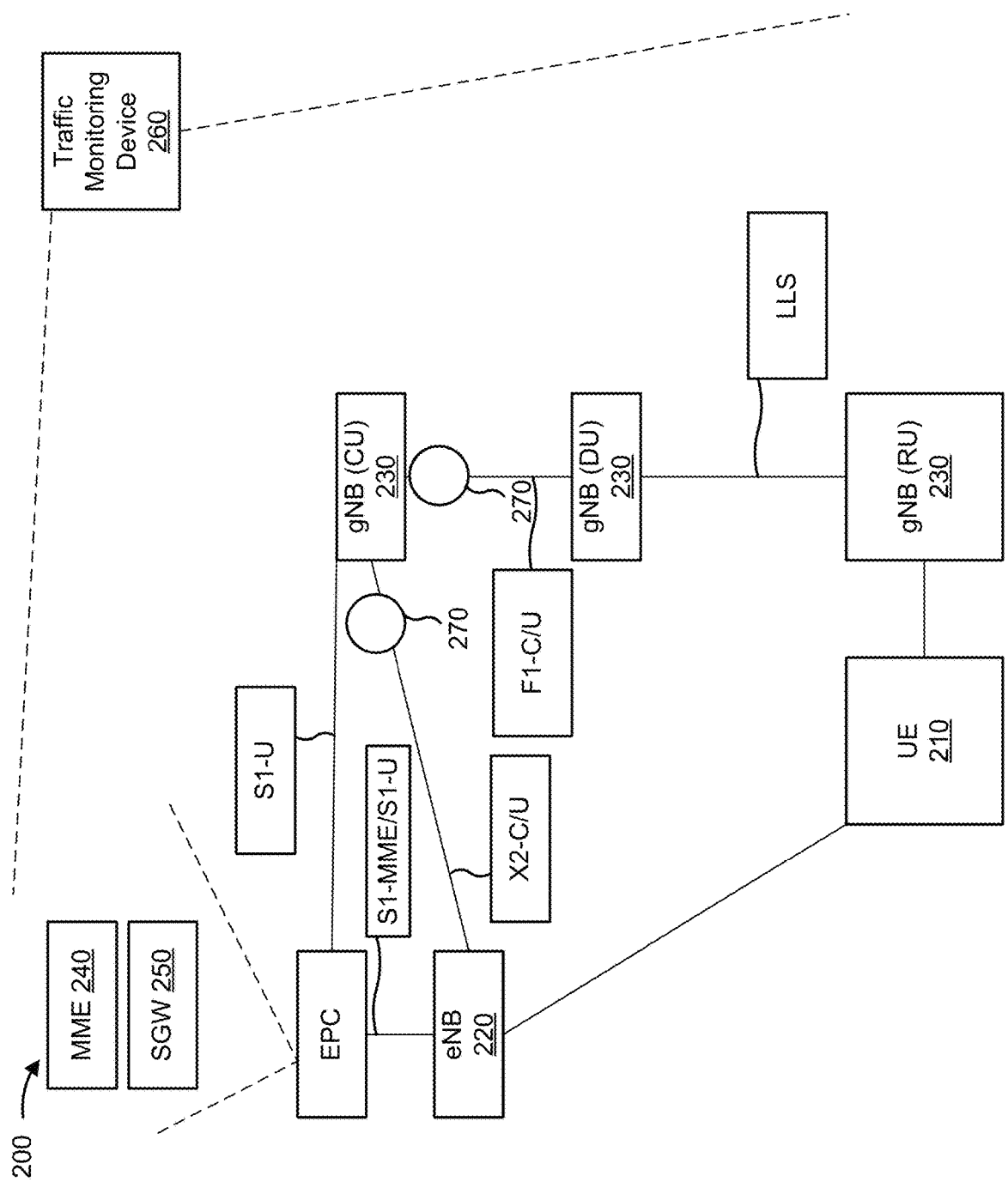
FIGS. 2A-2D are diagrams of one or more example environments in which systems and/or methods described herein may be implemented.
Figure 2B:
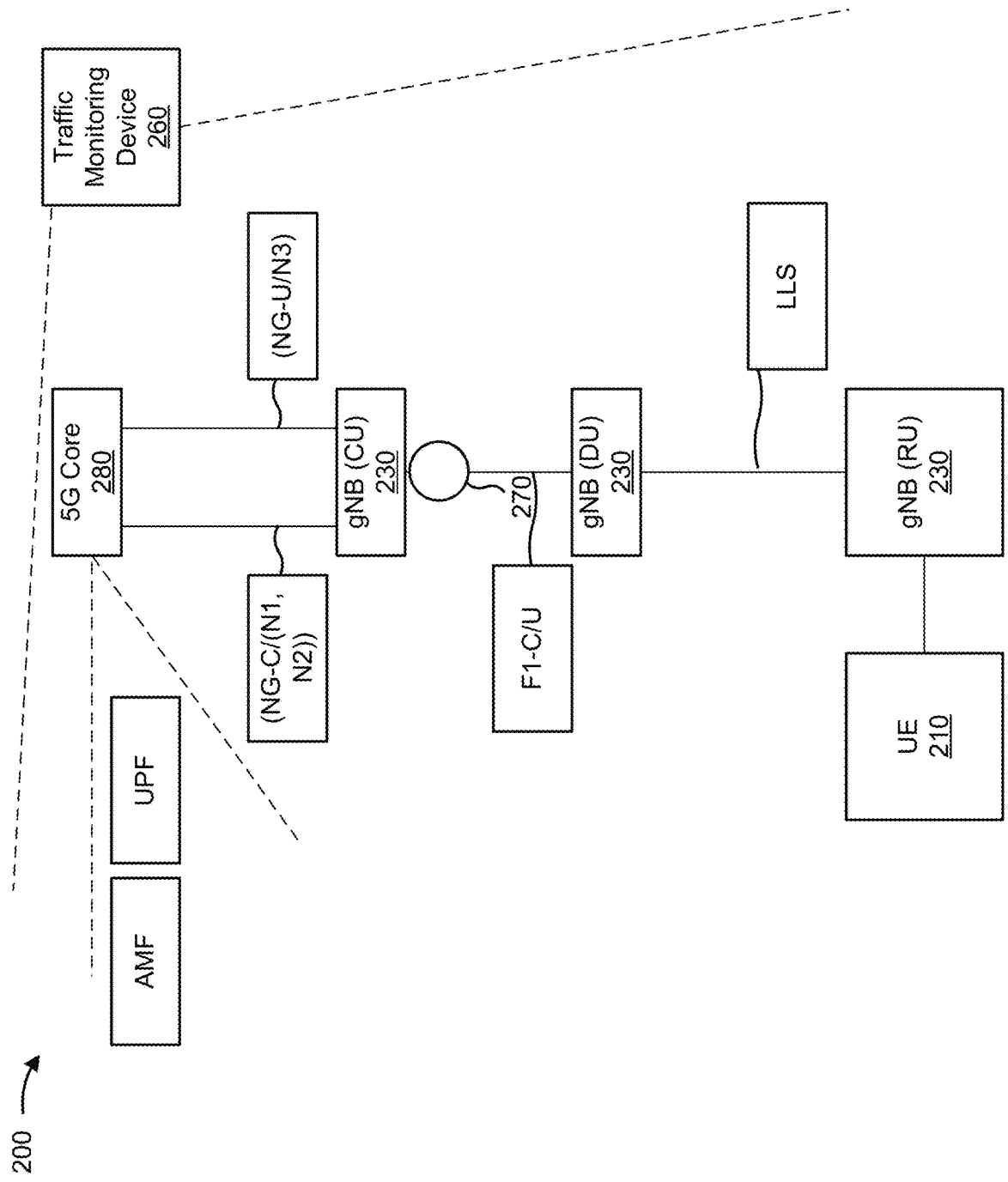
Figure 2C:
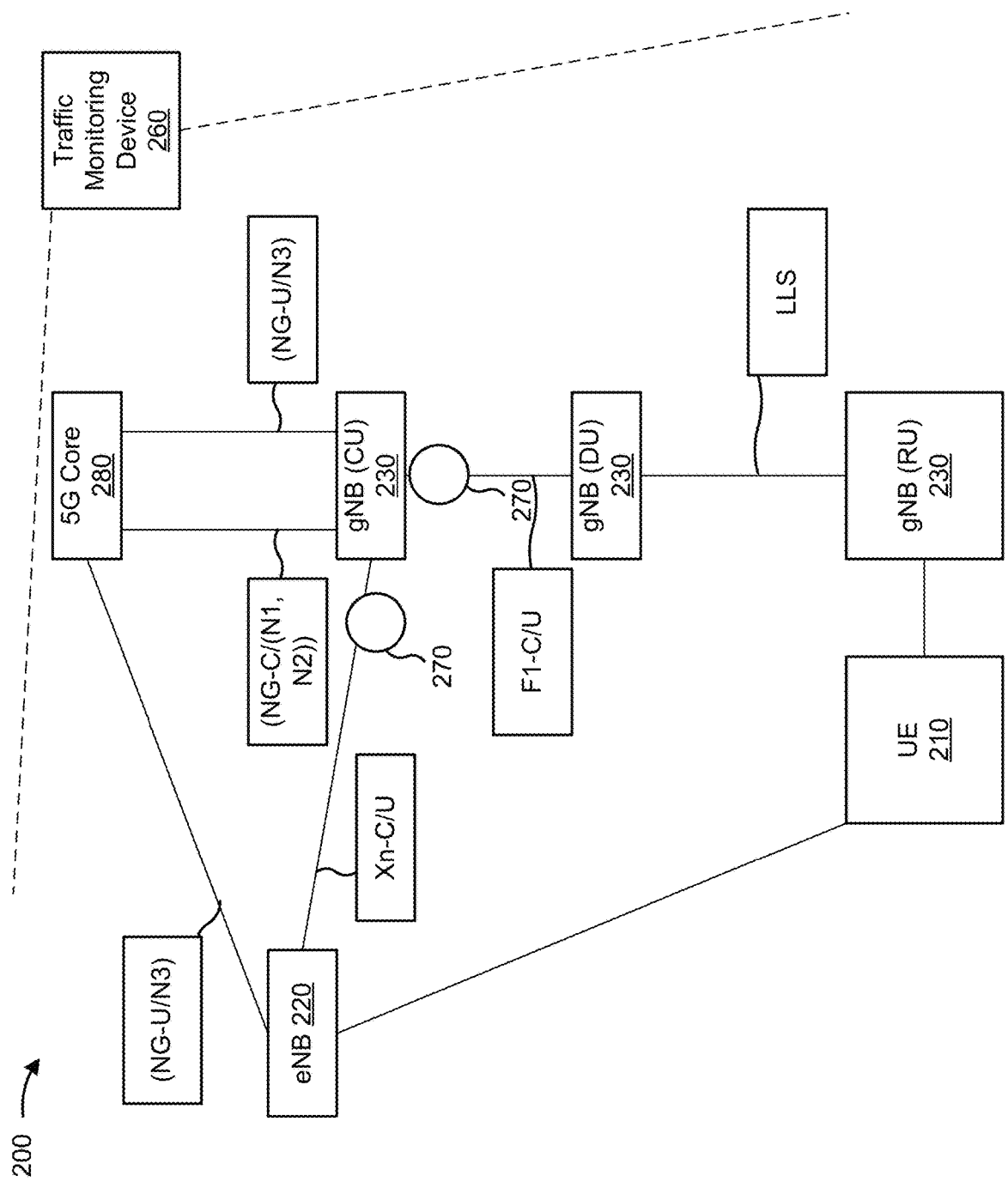
Figure 2D:
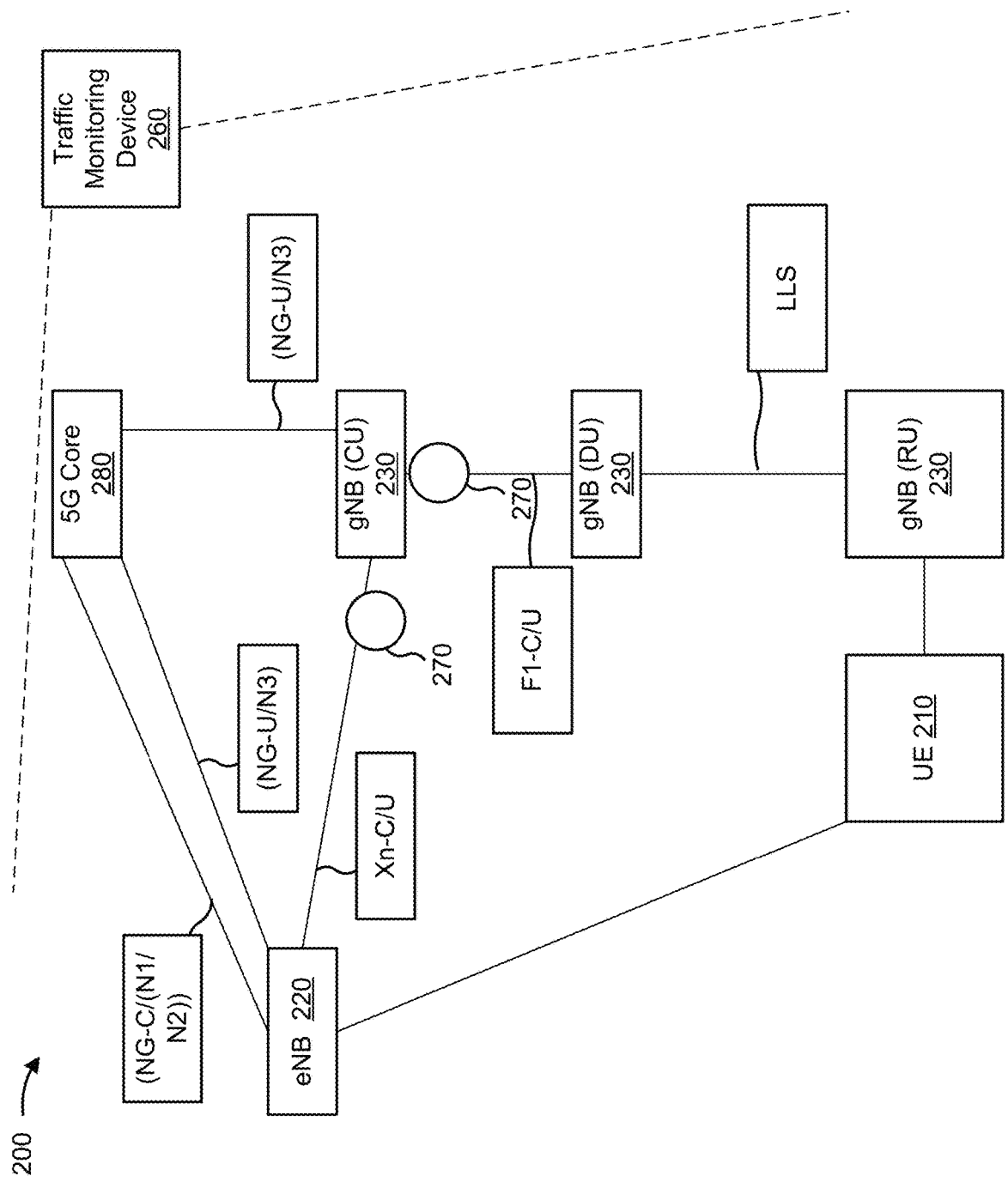

FIGS. 2A-2D are diagrams of various example environments 200 in which systems and/or methods described herein may be implemented. For example, FIG. 2A shows a non-standalone architecture (NSA) with a 4G evolved packet core (EPC) as a first environment 200, FIG. 2B shows a standalone architecture (SA) with a 5G core as a second environment 200, FIG. 2C shows an NSA with a 5G core as a third environment 200, and FIG. 2D shows another NSA with a 5G core as a fourth environment 200.

As shown in FIG. 2A, a first environment 200 may include a UE 210, an eNB 220, a set of gNBs 230, an MME 240 (e.g., associated with an EPC), an SGW 250 (e.g., associated with the EPC), a traffic monitoring device 260, and a network probe 270. Devices of the first environment 200 may interconnect via wired connections, wireless connections, or a combination of wired and wireless connections.

UE 210 includes one or more devices capable of communicating with a base station (e.g., eNB 220 and/or the set of gNBs 230) and/or a network. For example, UE 210 may include a mobile phone (e.g., a smartphone or a radiotelephone), a laptop computer, a tablet computer, a gaming device, a wearable communication device (e.g., a smart wristwatch or a pair of smart eyeglasses), or a similar type of device. Although FIG. 2 shows a single UE 210, in practice, there can be hundreds, thousands, millions, or more UEs 210 communicating with hundreds, thousands, millions, or more base stations, as described elsewhere herein.

The first environment 200 may further include a set of base stations (e.g., eNB 220 and/or the set of gNBs 230). A base station includes one or more devices capable of transferring traffic, such as audio, video, text, and/or other traffic, destined for and/or received from UE 210. In some implementations, a base station may include an eNB, a gNB, and/or the like associated with a long-term evolution (LTE) network, a 3G network, a 4G network, a 5G network, and/or the like that receives traffic from and/or sends traffic to a network via SGW 250 and/or a packet data network gateway (PGW). Additionally, or alternatively, one or more base stations may be associated with a radio access network (RAN) that is not associated with the LTE network. A base station can send traffic to and/or receive traffic from UE 210 via an air interface. In some implementations, a base station may include a small cell base station, such as a base station of a microcell, a picocell, and/or a femtocell.

In some implementations, eNB 220 may be associated with a 4G network. In some implementations, eNB 220 may receive traffic from UE 210, and may provide the traffic to gNB 230, as described elsewhere herein. In some implementations, the set of gNBs 230 may be associated with a 5G network. In some implementations, the set of gNBs 230 may receive traffic from UE 210, as described elsewhere herein. In some implementations, the set of gNBs 230 may include an gNB radio unit (RU) 230, an gNB (DU) 230, and/or an gNB (CU) 230, similar to that described elsewhere herein.

MME 240 includes one or more devices, such as one or more server devices, capable of managing authentication, activation, deactivation, and/or mobility functions associated with UE 210. In some implementations, MME 240 can perform operations relating to authentication of UE 210. Additionally, or alternatively, MME 240 can facilitate the selection of a particular SGW 250 and/or a particular PGW to serve traffic to and/or from UE 210. MME 240 can perform operations associated with handing off UE 210 from a first base station to a second base station when UE 210 is transitioning from a first cell associated with the first base station to a second cell associated with the second base station. Additionally, or alternatively, MME 240 can select another MME (not pictured), to which UE 210 should be handed off (e.g., when UE 210 moves out of range of MME 240).

SGW 250 includes one or more devices capable of routing packets. For example, SGW 250 may include one or more data processing and/or traffic transfer devices, such as a gateway, a router, a modem, a switch, a firewall, a network interface card (MC), a hub, a bridge, a server device, an optical add/drop multiplexer (OADM), or any other type of device that processes and/or transfers traffic. In some implementations, SGW 250 can aggregate traffic received from one or more base stations associated with the LTE network, and can send the aggregated traffic to a network (e.g., via a PGW) and/or other network devices associated with the evolved packet core (EPC) and/or an Internet protocol (IP) multimedia subsystem (IMS) core. SGW 250 can also receive traffic from a network and/or other network devices, and can send the received traffic to UE 210 via a base station. Additionally, or alternatively, SGW 250 can perform operations associated with handing off UE 210 to and/or from an LTE network.

In some implementations, an S1-MME/S1-U interface may connect eNB 220 and the EPC. Additionally, or alternatively, an S1-U interface may connect the EPC and gNB (CU) 230.

Traffic monitoring device 260 includes one or more devices capable of monitoring traffic associated with UE 210 on various interfaces associated with a network, and performing one or more analyses described herein based on the traffic. For example, traffic monitoring device 260 may include a server (e.g., in a data center or a cloud computing environment), a data center (e.g., a multi-server micro datacenter), a workstation computer, a virtual machine (VM) provided in a cloud computing environment, or a similar type of device. In some implementations, traffic monitoring device 260 may be a physical device implemented within a housing, such as a chassis. In some implementations, traffic monitoring device 260 may be a virtual device implemented by one or more computer devices of a cloud computing environment or a data center.

Network probe 270 includes one or more devices capable of monitoring traffic on multiple interfaces. For example, network probe 270 may include a probe, a network monitor, a packet sniffer, or a similar type of device. In some implementations, network probe 270 may be deployed on one or more of the multiple interfaces, as described elsewhere herein. Additionally, or alternatively, network probe 270 may provide, to traffic monitoring device 260, information related to traffic that network probe 270 monitors, as described elsewhere herein. In some implementations, network probe 270 may be a physical device deployed on an interface between two other physical devices. In some implementations, network probe 270 may be a virtual device implemented by one or more devices of FIG. 2A or one or more devices not shown in FIG. 2A.

As further shown in FIG. 2A, devices of the first environment 200 may include various interfaces between devices of the first environment 200. For example, the first environment 200 may include an F1-C/U interface (e.g., via which measurement reports, beam identifiers, cell identifiers, RSRP, RSRQ, SINR, and/or the like may be obtained), an X2-C/U interface (e.g., measurement reports may be obtained from the X2-C interface and user plane throughput data may be obtained from the X2-U interface), a lower layer split (LLS) interface, and/or the like.

FIG. 2B shows an SA with a 5G core as a second environment 200. As shown in FIG. 2B, the second environment 200 may include UE 210, a set of gNBs 230, traffic monitoring device 260, network probe 270, and a 5G core 280 that includes an access and mobility management function (AMF) and a user plane function (UPF). Devices of the second environment 200 may interconnect via wired connections, wireless connections, or a combination of wired and wireless connections.

5G core 280 may include one or more devices related to providing traffic to UE 210 and/or providing traffic from UE 210 to a destination. For example, 5G core 280 may include the AMF, the UPF, and/or the like. In some implementations, the AMF includes a hardware-based element that may act as a termination point for Non Access Stratum (NAS) signaling, mobility management, and/or the like. In some implementations, the UPF includes a hardware-based element that may serve as an anchor point for intra/inter-Radio Access Technology (RAT) mobility, that can apply rules to packets, such as rules pertaining to packet routing, traffic reporting, handling user plane QoS, and/or the like. In some implementations, 5G core 280 may be connected to gNB (CU) 230 via a set of interfaces (e.g., an NG-C/N1,N2 interface, an NG-U/N3 interface, and/or the like).

As further shown in FIG. 2B, the second environment 200 may include various interfaces between devices of the second environment 200 similar to that described above. For example, the second environment 200 may include an NG-C/(N1, N2) interface (e.g., via which an IMSI, a subscriber identifier, a SUPI, a SUCI, and/or the like may be obtained, via which an IMEI, an IMEISV, a device identifier, a PEI, and/or the like may be obtained, and/or the like), various NG-U/N3 interfaces (e.g., via which data related to a user experience, such as throughput data, and/or the like may be obtained), an F1-C/U interface, and/or the like.

FIG. 2C shows an NSA with a 5G core as a third environment 200. As shown in FIG. 2C, the third environment 200 may include UE 210, eNB 220, a set of gNBs 230, traffic monitoring device 260, various network probes 270, and 5G core 280. Devices of the first environment 200 may interconnect via wired connections, wireless connections, or a combination of wired and wireless connections.

As further shown in FIG. 2C, the third environment 200 may include various interfaces between elements of the NSA similar to that described above (e.g., the third environment 200 may include an Xn-C/U interface rather than an X2-C/U interface described with regard to the first environment 200). In some implementations, the various network probes 270 may be deployed on the various interfaces to monitor the various interfaces in a manner that is the same as or similar to that described elsewhere herein. In some implementations, traffic monitoring device 260 may process traffic from the various network probes 270 in a manner that is the same as or similar to that described elsewhere herein.

FIG. 2D shows another NSA with a 5G core as a fourth environment 200. As shown in FIG. 2D, the fourth environment 200 may include similar devices and/or interfaces to that described above, but in a different configuration (e.g., the fourth environment 200 may include an Xn-C/U interface rather than an X2-C/U interface described with regard to the first environment 200). For example, the fourth environment 200 may include an NG-C/(N1, N2) interface between eNB 220 and 5G core 280, rather than between 5G core 280 and gNB (CU) 230.

The number and arrangement of devices shown in FIGS. 2A-2D are provided as one or more examples. In practice, there may be additional devices, fewer devices, different devices, or differently arranged devices than those shown in FIGS. 2A-2D. Furthermore, two or more devices shown in FIGS. 2A-2D may be implemented within a single device, or a single device shown in FIGS. 2A-2D may be implemented as multiple, distributed devices. Additionally, or alternatively, a set of devices (e.g., one or more devices) of the one or more environments 200 may perform one or more functions described as being performed by another set of devices of the one or more environments 200.

Figure 3:
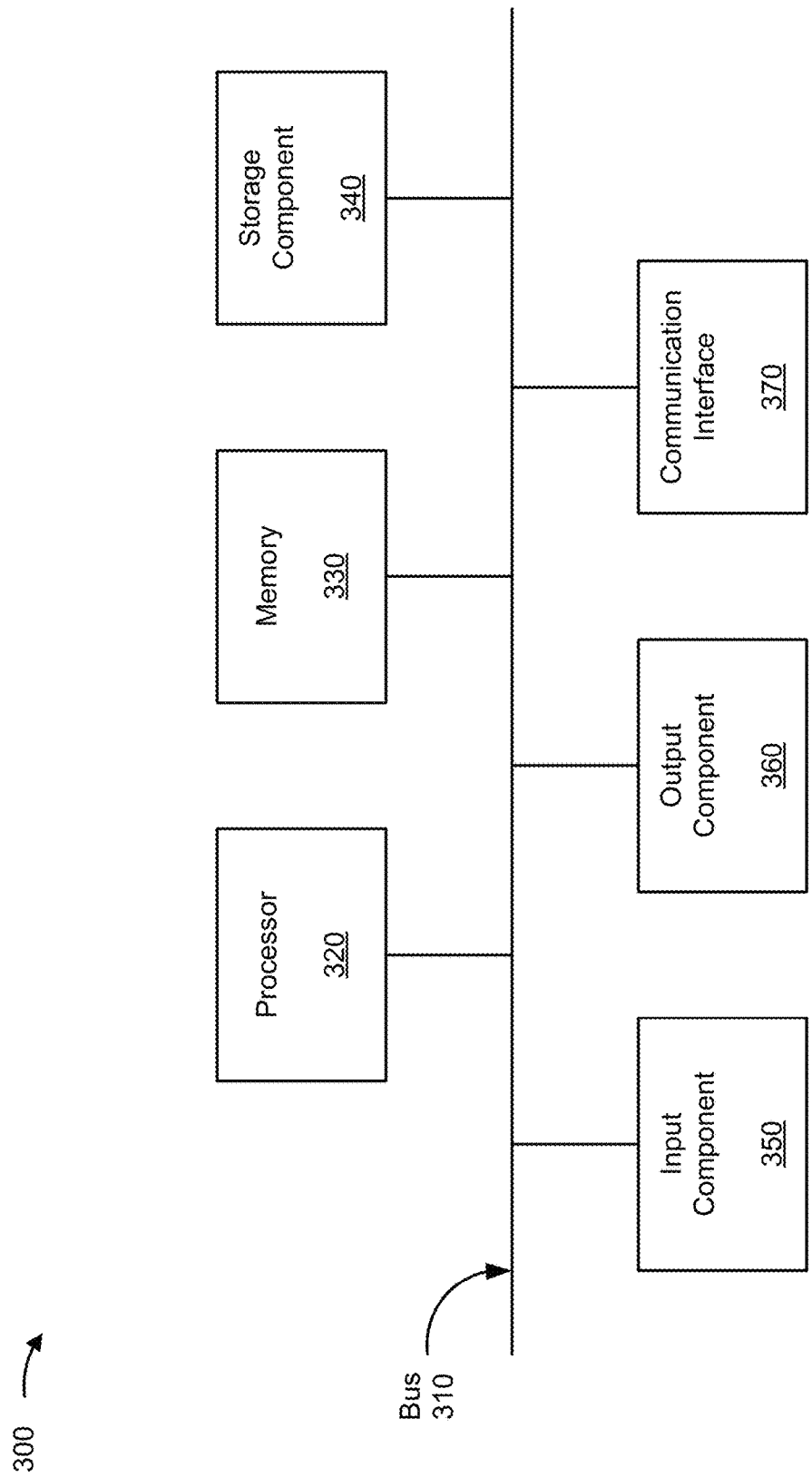
FIG. 3 is a diagram of example components of one or more devices of FIGS. 2A-2D.

FIG. 3 is a diagram of example components of a device 300. Device 300 may correspond to UE 210, eNB 220, gNB 230, MME 240, SGW 250, traffic monitoring device 260, network probe 270, the AMF of 5G Core 280, and/or the UPF of 5G core 280. In some implementations, UE 210, eNB 220, gNBs 230, MME 240, SGW 250, traffic monitoring device 260, network probe 270, the AMF of 5G core 280, and/or the UPF of 5G core 280 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
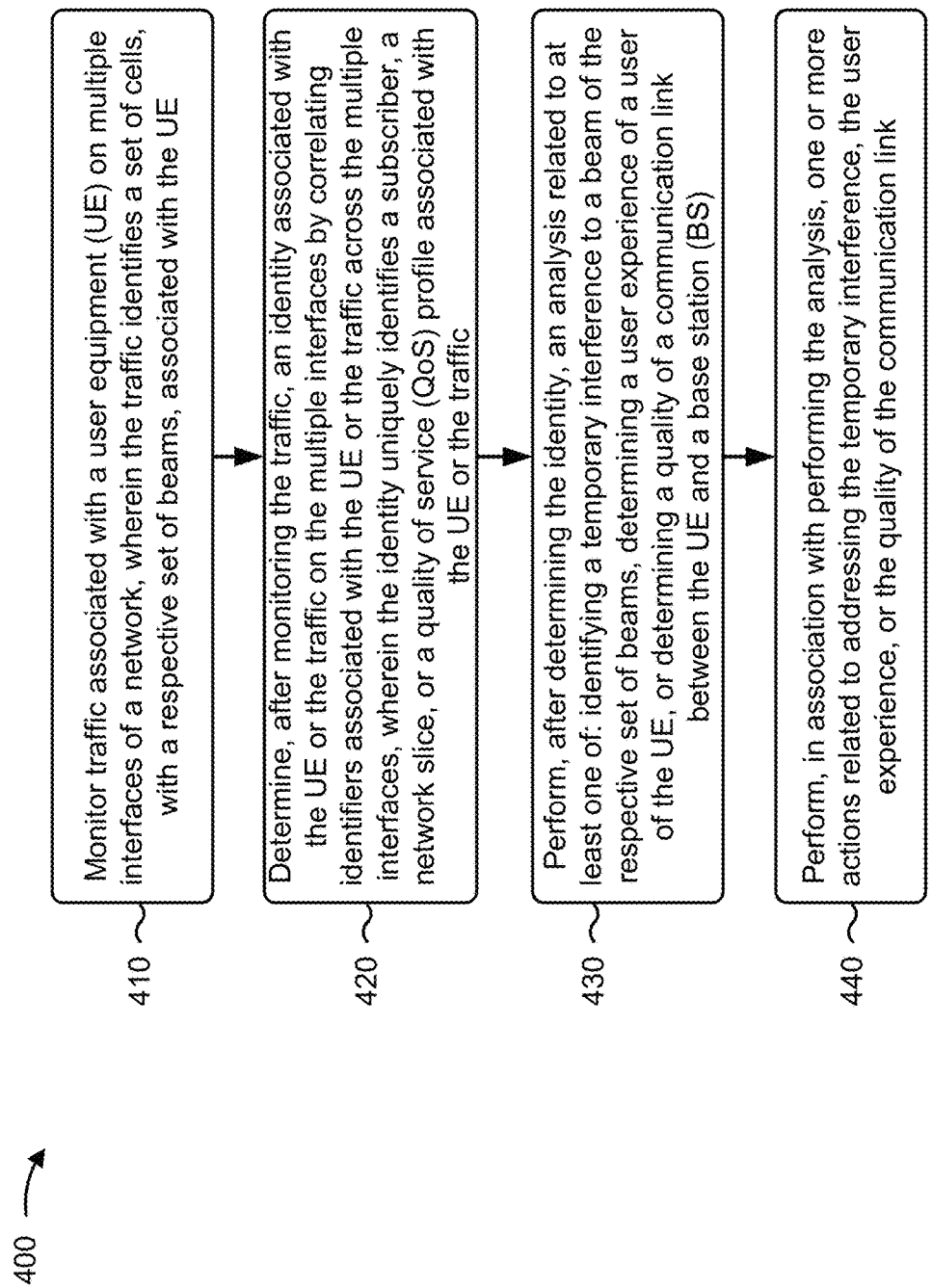
FIGS. 4-6 are flow charts of example processes for detecting interference of a beam.

FIG. 4 is a flow chart of an example process 400 for detecting interference of a beam. In some implementations, one or more process blocks of FIG. 4 may be performed by a traffic monitoring device (e.g., traffic monitoring device 260). In some implementations, one or more process blocks of FIG. 4 may be performed by another device or a group of devices separate from or including the traffic monitoring device, such as a UE (e.g., UE 210), an eNB (e.g., eNB 220), an gNB (e.g., gNB 230), an MME (e.g., MME 240), an SGW (e.g., SGW 250), a network probe (e.g., network probe 270), and one or more devices of a 5G core (e.g., 5G core 280).

As shown in FIG. 4, process 400 may include monitoring traffic associated with a user equipment (UE) on multiple interfaces of a network, wherein the traffic identifies a set of cells, with a respective set of beams, associated with the UE (block 410). For example, the traffic monitoring device (e.g., using processor 320, communication interface 370, and/or the like) may monitor traffic associated with a user equipment (UE) on multiple interfaces of a network, as described above. In some implementations, the traffic identifies a set of cells, with a respective set of beams, associated with the UE.

As further shown in FIG. 4, process 400 may include determining, after monitoring the traffic, an identity associated with the UE or the traffic on the multiple interfaces by correlating identifiers associated with the UE or the traffic across the multiple interfaces, wherein the identity uniquely identifies a subscriber, a network slice, or a quality of service (QoS) profile associated with the UE or the traffic (block 420). For example, the traffic monitoring device (e.g., using processor 320, and/or the like) may determine, after monitoring the traffic, an identity associated with the UE or the traffic on the multiple interfaces by correlating identifiers associated with the UE or the traffic across the multiple interfaces, as described above. In some implementations, the identity uniquely identifies a subscriber, a network slice, or a quality of service (QoS) profile associated with the UE or the traffic.

As further shown in FIG. 4, process 400 may include performing, after determining the identity, an analysis related to at least one of: identifying a temporary interference to a beam of the respective set of beams, determining a user experience of a user of the UE, or determining a quality of a communication link between the UE and a base station (BS) (block 430). For example, the traffic monitoring device (e.g., using processor 320, and/or the like) may perform, after determining the identity, an analysis related to at least one of: identifying a temporary interference to a beam of the respective set of beams, determining a user experience of a user of the UE, or determining a quality of a communication link between the UE and a base station (BS), as described above.

As further shown in FIG. 4, process 400 may include performing, in association with performing the analysis, one or more actions related to addressing the temporary interference, the user experience, or the quality of the communication link (block 440). For example, the traffic monitoring device (e.g., using processor 320, memory 330, storage component 340, output component 360, communication interface 370, and/or the like) may perform, in association with performing the analysis, one or more actions related to addressing the temporary interference, the user experience, or the quality of the communication link, as described above.

Process 400 may include additional implementations, such as any single implementation or any combination of implementations described below and/or in connection with one or more other processes described elsewhere herein.

In some implementations, the multiple interfaces include one or more of: a third generation partnership project (3GPP) F1 interface associated with a first network probe, a 3GPP Xn interface associated with a second network probe, or a 3GPP X2 interface associated with a third network probe. In some implementations, the traffic includes at least one of: user data associated with the UE, a data delivery status message associated with the user data, an assistance information data message associated with the user data, or various parameters associated with the user data, the data delivery status message, or the assistance information data message.

In some implementations, the traffic monitoring device may determine a location of the UE in association with performing the analysis, and may determine a location of the temporary interference based on the location of the UE. In some implementations, the traffic monitoring device may detect a pattern of interference over time associated with one or more of the respective set of beams based on the traffic, and may identify the temporary interference based on detecting the pattern of interference over time.

In some implementations, the traffic monitoring device may detect an issue associated with the traffic associated with the UE, wherein the issue is related to at least one of: a throughput of a portion of the traffic exchanged between the UE and the BS, or a round trip time associated with the portion of the traffic; and may detect, after detecting the issue associated with the traffic, an issue associated with the user experience of the user of the UE based on the at least one of the throughput of the portion or the round trip time of the portion. In some implementations, the traffic monitoring device may determine a location of the UE after detecting the issue associated with the user experience of the user of the UE; may identify, after determining the location of the UE, a pattern of issues associated with respective user experiences of multiple UEs at the location; and may determine, based on the pattern of issues associated with the respective user experiences of the multiple UEs, that the issue associated with the user experience of the user of the UE is caused by the temporary interference.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
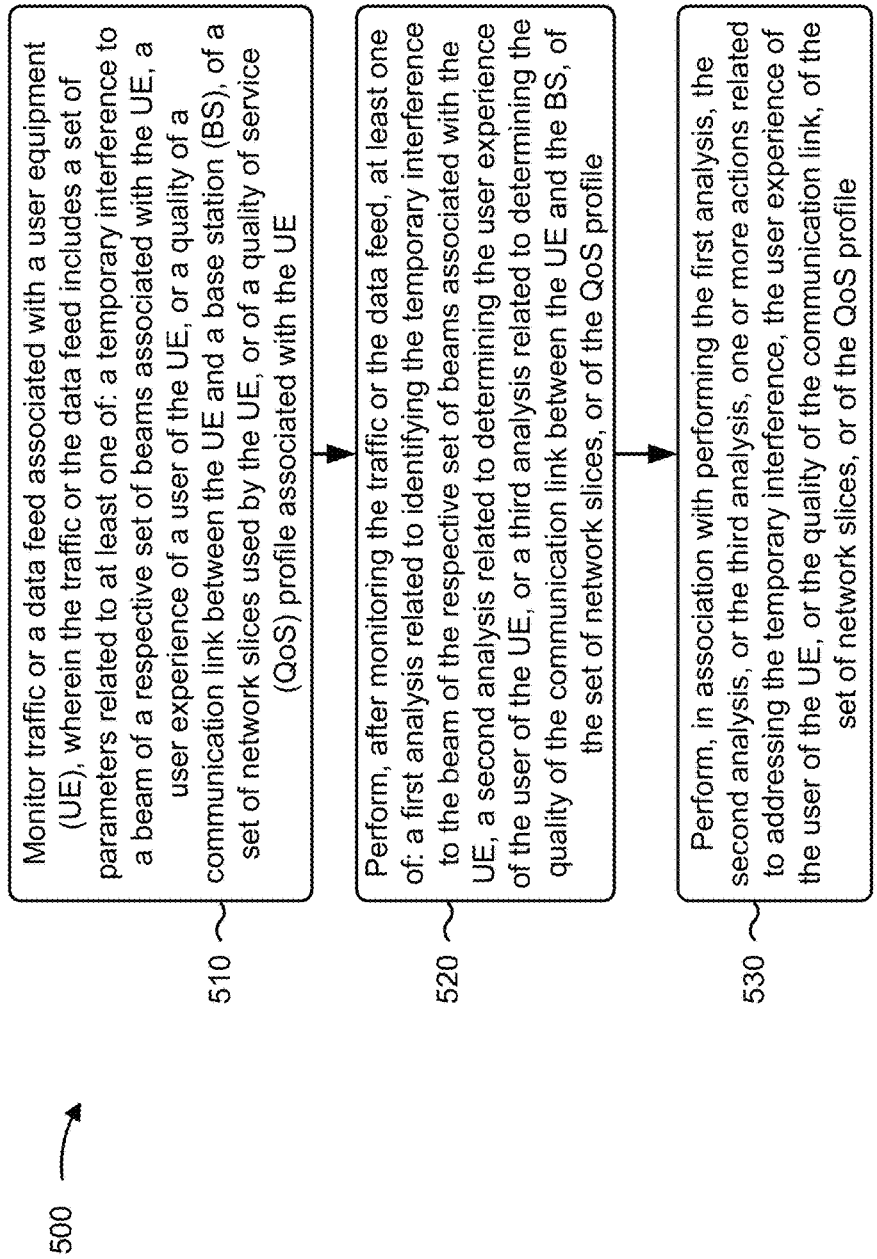

FIG. 5 is a flow chart of an example process 500 for detecting interference of a beam. In some implementations, one or more process blocks of FIG. 5 may be performed by a traffic monitoring device (e.g., traffic monitoring device 260). In some implementations, one or more process blocks of FIG. 5 may be performed by another device or a group of devices separate from or including the traffic monitoring device, such as a UE (e.g., UE 210), an eNB (e.g., eNB 220), an gNB (e.g., gNB 230), an MME (e.g., MME 240), an SGW (e.g., SGW 250), a network probe (e.g., network probe 270), and one or more devices of a 5G core (e.g., 5G core 280).

As shown in FIG. 5, process 500 may include monitoring traffic or a data feed associated with a user equipment (UE), wherein the traffic or the data feed includes a set of parameters related to at least one of: a temporary interference to a beam of a respective set of beams associated with the UE, a user experience of a user of the UE, or a quality of a communication link between the UE and a base station (BS), of a set of network slices used by the UE, or of a quality of service (QoS) profile associated with the UE (block 510).

For example, the traffic monitoring device (e.g., using processor 320, communication interface 370, and/or the like) may monitor traffic or a data feed associated with a user equipment (UE), as described above. In some implementations, the traffic or the data feed includes a set of parameters related to at least one of: a temporary interference to a beam of a respective set of beams associated with the UE, a user experience of a user of the UE, or a quality of a communication link between the UE and a base station (BS), of a set of network slices used by the UE, or of a quality of service (QoS) profile associated with the UE.

As further shown in FIG. 5, process 500 may include performing, after monitoring the traffic or the data feed, at least one of: a first analysis related to identifying the temporary interference to the beam of the respective set of beams associated with the UE, a second analysis related to determining the user experience of the user of the UE, or a third analysis related to determining the quality of the communication link between the UE and the BS, of the set of network slices, or the QoS profile (block 520). For example, the traffic monitoring device (e.g., using processor 320, and/or the like) may perform, after monitoring the traffic or the data feed, at least one of: a first analysis related to identifying the temporary interference to the beam of the respective set of beams associated with the UE, a second analysis related to determining the user experience of the user of the UE, or a third analysis related to determining the quality of the communication link between the UE and the BS, of the set of network slices, or of the QoS profile, as described above.

As further shown in FIG. 5, process 500 may include performing, in association with performing the first analysis, the second analysis, or the third analysis, one or more actions related to addressing the temporary interference, the user experience of the user of the UE, or the quality of the communication link, of the set of network slices, or of the QoS profile (block 530). For example, the traffic monitoring device (e.g., using processor 320, and/or the like) may perform, in association with performing the first analysis, the second analysis, or the third analysis, one or more actions related to addressing the temporary interference, the user experience of the user of the UE, or the quality of the communication link, of the set of network slices, or of the QoS profile, as described above.

Process 500 may include additional implementations, such as any single implementation or any combination of implementations described below and/or in connection with one or more other processes described elsewhere herein.

In some implementations, the traffic monitoring device may determine a location of the UE by identifying at least one of: a connected beam, of the respective set of beams, associated with the UE that identifies the location of the UE relative to the BS, a set of surrounding beams, of the respective set of beams, associated with the UE, or a respective set of measurements for the set of surrounding beams that identifies a position of the UE within the connected beam relative to the set of surrounding beams; and may determine a location of the temporary interference based on determining the location of the UE. In some implementations, the traffic monitoring device may generate, after performing the at least one of the first analysis, the second analysis, or the third analysis, a heat map related to a set of cells associated with the BS or the respective set of beams associated with the set of cells; and may provide, after generating the heat map, the heat map for display via a display associated with another UE associated with a technician, or provide data related to the heat map as a data export to a storage location.

In some implementations, the traffic monitoring device may provide, to the other UE associated with the technician, a stream of data related to the set of cells or related to the respective set of beams. In some implementations, the traffic monitoring device may generate, after performing the at least one of the first analysis, the second analysis, or the third analysis, a virtual map that includes an identifier for a location of the UE or a location of the temporary interference; and may provide the virtual map for display via a display associated with another UE after generating the virtual map, or output a result related to the first analysis, the second analysis, or the third analysis to a network data analysis function (NWDAF) in association with generating the virtual map.

In some implementations, the traffic monitoring device may determine, from the set of parameters included in the traffic or the data feed, the quality of the communication link based on at least one of: a radio quality index associated with the communication link, a set of quality measurements associated with one or more of the respective set of beams associated with the communication link, or a set of power measurements associated with the one or more of the respective set of beams associated with the communication link. In some implementations, the traffic monitoring device may cause a technician to be dispatched to a location of the temporary interference to address the temporary interference.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
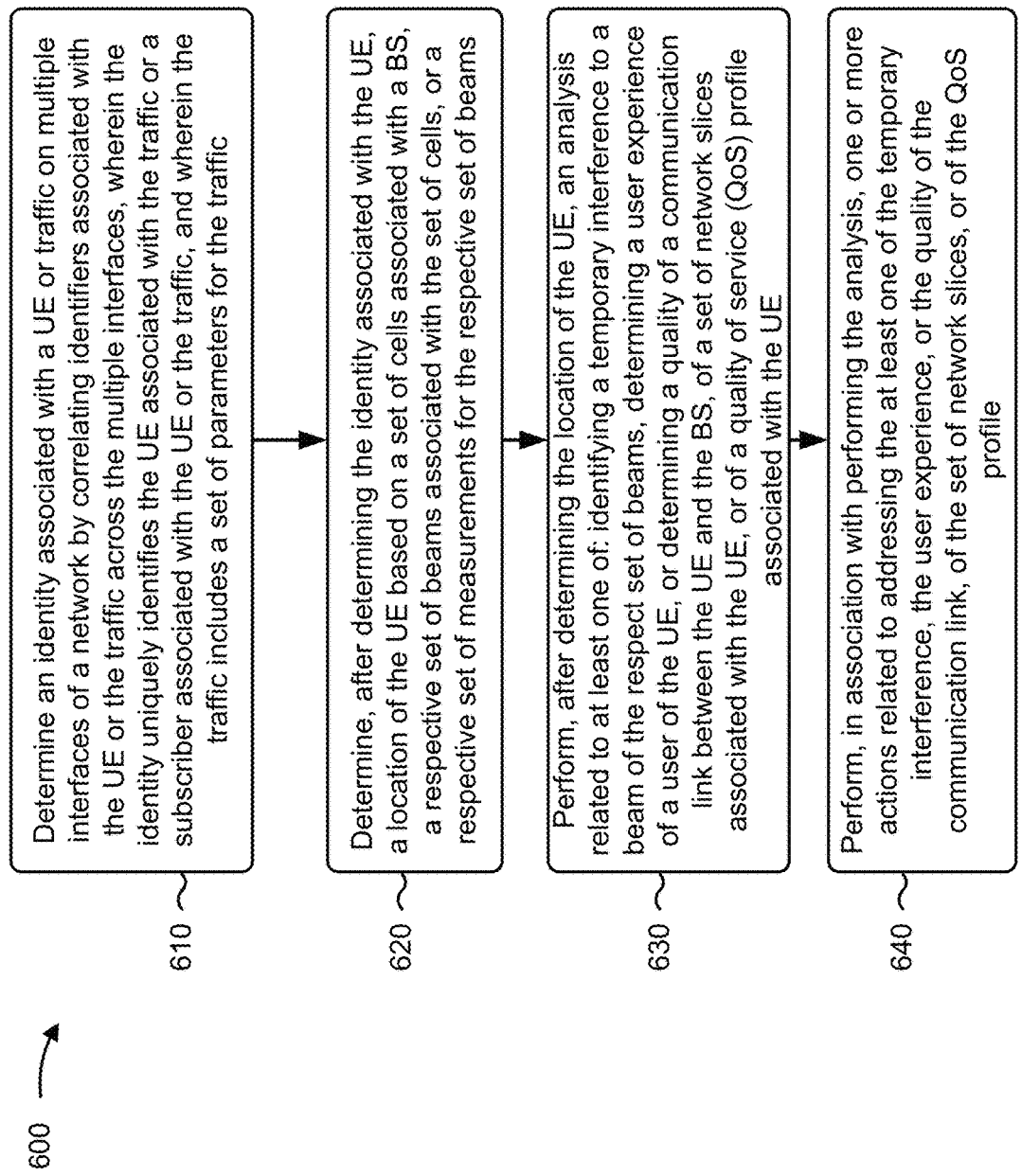

FIG. 6 is a flow chart of an example process 600 for detecting interference of a beam. In some implementations, one or more process blocks of FIG. 6 may be performed by a traffic monitoring device (e.g., traffic monitoring device 260). In some implementations, one or more process blocks of FIG. 6 may be performed by another device or a group of devices separate from or including the traffic monitoring device, such as a UE (e.g., UE 210), an eNB (e.g., eNB 220), an gNB (e.g., gNB 230), an MME (e.g., MME 240), an SGW (e.g., SGW 250), a network probe (e.g., network probe 270), and one or more devices of a 5G core (e.g., 5G core 280).

As shown in FIG. 6, process 600 may include determining an identity associated with a UE or traffic on multiple interfaces of a network by correlating identifiers associated with the UE or the traffic across the multiple interfaces, wherein the identity uniquely identifies the UE associated with the traffic or a subscriber associated with the UE or the traffic, and wherein the traffic includes a set of parameters for the traffic (block 610). For example, the traffic monitoring device (e.g., using processor 320, and/or the like) may determine an identity associated with a UE or traffic on multiple interfaces of a network by correlating identifiers associated with the UE or the traffic across the multiple interfaces, as described above. In some implementations, the identity uniquely identifies the UE associated with the traffic or a subscriber associated with the UE or the traffic. In some implementations, the traffic includes a set of parameters for the traffic.

As further shown in FIG. 6, process 600 may include determining, after determining the identity associated with the UE, a location of the UE based on a set of cells associated with a BS, a respective set of beams associated with the set of cells, or a respective set of measurements for the respective set of beams (block 620). For example, the traffic monitoring device (e.g., using processor 320, and/or the like) may determine, after determining the identity associated with the UE, a location of the UE based on a set of cells associated with a BS, a respective set of beams associated with the set of cells, or a respective set of measurements for the respective set of beams, as described above.

As further shown in FIG. 6, process 600 may include performing, after determining the location of the UE, an analysis related to at least one of: identifying a temporary interference to a beam of the respect set of beams, determining a user experience of a user of the UE, or determining a quality of a communication link between the UE and the BS, of a set of network slices associated with the UE, or of a quality of service (QoS) profile associated with the UE (block 630). For example, the traffic monitoring device (e.g., using processor 320, and/or the like) may perform, after determining the location of the UE, an analysis related to at least one of: identifying a temporary interference to a beam of the respect set of beams, determining a user experience of a user of the UE, or determining a quality of a communication link between the UE and the BS, of a set of network slices associated with the UE, or of a quality of service (QoS) profile associated with the UE, as described above.

As further shown in FIG. 6, process 600 may include performing, in association with performing the analysis, one or more actions related to addressing the at least one of the temporary interference, the user experience, or the quality of the communication link, of the set of network slices, or of the QoS profile (block 640). For example, the traffic monitoring device (e.g., using processor 320, memory 330, storage component 340, output component 360, communication interface 370, and/or the like) may perform, in association with performing the analysis, one or more actions related to addressing the at least one of the temporary interference, the user experience, or the quality of the communication link, of the set of network slices, or of the QoS profile, as described above.

Process 600 may include additional implementations, such as any single implementation or any combination of implementations described below and/or in connection with one or more other processes described elsewhere herein.

In some implementations, the traffic monitoring device may associate a location of the temporary interference with a subset of the respective set of beams by identifying at least one of: a missing connected beam from the respective set of beams, a missing surrounding beam from a set of surrounding beams associated with the UE, or a measurement associated with the respective set of beams that satisfies a threshold. In some implementations, the traffic monitoring device may identify a pattern of a beam reflection of a subset of the respective set of beams by identifying at least one of: a pattern of an unexpected connected beam, of the respective set of beams, associated with the UE, or a pattern of an unexpected surrounding beam, of the respective set of beams, associated with the UE, wherein the pattern of the beam reflection is a result of the temporary interference.

In some implementations, the respective set of measurements identifies at least one of: a respective reference signal received power (RSRP) of the respective set of beams, a respective reference signal received quality (RSRQ) of the respective set of beams, or a respective signal-to-interference-plus-noise ratio (SINR) of the respective set of beams.

In some implementations, the traffic monitoring device may aggregate a respective result of performing the analysis across multiple UEs after performing the analysis for the multiple UEs, wherein the multiple UEs include the UE; and may generate a set of recommendations related to reconfiguring a coverage or a capacity of the set of cells or the respective set of beams after aggregating the respective result of performing the analysis across the multiple UEs. In some implementations, the traffic monitoring device may perform troubleshooting of an issue related to the UE after performing the analysis, wherein the troubleshooting is related to addressing at least one of: the temporary interference, the user experience of the user of the UE, or the quality of the communication link, of the set of network slices, or of the QoS profile.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    monitoring, by a device, traffic associated with a user equipment (UE) on multiple interfaces of a network,
        wherein the traffic identifies a set of cells, with a respective set of beams, associated with the UE;
    determining, by the device and after monitoring the traffic, an identity, associated with the UE or the traffic, on the multiple interfaces by correlating identifiers associated with the UE or the traffic across the multiple interfaces,
        wherein the identity uniquely identifies a subscriber, a network slice, or a quality of service (QoS) profile associated with the UE or the traffic;
    performing, by the device and after determining the identity, a first analysis at various times,
        wherein the first analysis is related to measurements and/or parameters identified from monitoring the traffic;
    identifying, by the device and based on performing the first analysis at various times, a temporary interference, to a beam of the respective set of beams, caused by a physical obstruction;
    performing, by the device and after determining the identity:
        a second analysis related to determining a user experience of a user of the UE, and
        a third analysis related to determining a quality of a communication link between the UE and a base station (BS); and
    performing, by the device and in association with performing the first analysis, the second analysis, and the third analysis, one or more actions related to addressing the temporary interference, the user experience, or the quality of the communication link.

2. The method of claim 1, wherein the multiple interfaces include one or more of:
    a third generation partnership project (3GPP) F1 interface associated with a first network probe,
    a 3GPP Xn interface associated with a second network probe, or
    a 3GPP X2 interface associated with a third network probe.

3. The method of claim 1, wherein the traffic includes at least one of:
    user data associated with the UE,
    a data delivery status message associated with the user data,
    an assistance information data message associated with the user data, or
    various parameters associated with the user data, the data delivery status message, or the assistance information data message.

4. The method of claim 1, further comprising:
    determining a location of the UE in association with performing the first analysis; and
    determining a location of the temporary interference based on the location of the UE.

5. The method of claim 1, wherein performing the first analysis comprises:

detecting a pattern of interference over time associated with one or more of the respective set of beams based on the traffic; and wherein identifying the temporary interference comprises:

identifying the temporary interference based on detecting the pattern of interference over time.

6. The method of claim 1, wherein performing the second analysis comprises:

detecting an issue associated with the traffic associated with the UE, wherein the issue is related to at least one of:

a throughput of a portion of the traffic exchanged between the UE and the BS, or a round trip time associated with the portion of the traffic; and detecting, after detecting the issue associated with the traffic, an issue associated with the user experience of the user of the UE based on the at least one of the throughput of the portion or the round trip time of the portion.

7. The method of claim 6, further comprising:

determining a location of the UE after detecting the issue associated with the user experience of the user of the UE;

identifying, after determining the location of the UE, a pattern of issues associated with respective user experiences of multiple UEs at the location; and determining, based on the pattern of issues associated with the respective user experiences of the multiple UEs, that the issue associated with the user experience of the user of the UE is caused by the temporary interference.

8. A device, comprising:

one or more memories; and one or more processors, communicatively coupled to the one or more memories, configured to:

monitor traffic or a data feed associated with a user equipment (UE), wherein the traffic or the data feed includes a set of parameters related to at least one of:

a temporary interference to a beam of a respective set of beams associated with the UE, a user experience of a user of the UE, or a quality of a communication link between the UE and a base station (B S), of a set of network slices used by the UE, or of a quality of service (QoS) profile associated with the UE;

perform, after monitoring the traffic or the data feed, a first analysis at various times, wherein the first analysis is related to measurements and/or the set of parameters identified from monitoring the traffic;

identify, based on performing the first analysis at various times, the temporary interference to the beam;

perform, after monitoring the traffic or the data feed:

a second analysis related to determining the user experience of the user of the UE, and a third analysis related to determining the quality of the communication link between the UE and the BS, of the set of network slices, or of the QoS profile; and perform, in association with performing the first analysis, the second analysis, and the third analysis, one or more actions related to addressing the temporary interference, the user experience of the user of the UE, or the quality of the communication link, of the set of network slices, or of the QoS profile.

9. The device of claim 8, wherein the one or more processors are further configured to:

determine a location of the UE by identifying at least one of:

a connected beam, of the respective set of beams, associated with the UE that identifies the location of the UE relative to the BS, a set of surrounding beams, of the respective set of beams, associated with the UE, or a respective set of measurements for the set of surrounding beams that identifies a position of the UE within the connected beam relative to the set of surrounding beams; and determine a location of the temporary interference based on determining the location of the UE.

10. The device of claim 8, wherein the one or more processors are further configured to:

generate, after performing the first analysis, the second analysis, and the third analysis, a heat map related to a set of cells associated with the BS or the respective set of beams associated with the set of cells; and provide, after generating the heat map, the heat map for display via a display associated with another UE associated with a technician, or provide data related to the heat map as a data export to a storage location.

11. The device of claim 10, wherein the one or more processors are further configured to:

provide, to the other UE associated with the technician, a stream of data related to the set of cells or related to the respective set of beams.

12. The device of claim 8, wherein the one or more processors are further configured to:

generate, after performing the first analysis, the second analysis, and the third analysis, a virtual map that includes an identifier for a location of the UE or a location of the temporary interference; and provide the virtual map for display via a display associated with another UE after generating the virtual map, or output a result related to the first analysis, the second analysis, and the third analysis to a network data analysis function (NWDAF) in association with generating the virtual map.

13. The device of claim 8, wherein the one or more processors, when performing the third analysis, are configured to:

determine, from the set of parameters included in the traffic or the data feed, the quality of the communication link based on at least one of:

a radio quality index associated with the communication link, a set of quality measurements associated with one or more of the respective set of beams associated with the communication link, or a set of power measurements associated with the one or more of the respective set of beams associated with the communication link.

14. The device of claim 8, wherein the one or more processors, when performing the one or more actions, are configured to:

cause a technician to be dispatched to a location of the temporary interference to address the temporary interference.

15. A non-transitory computer-readable medium storing instructions, the instructions comprising:
one or more instructions that, when executed by one or more processors of a device, cause the one or more processors to:
determine an identity, associated with a user equipment (UE) or traffic on multiple interfaces of a network by correlating identifiers associated with the UE or the traffic across the multiple interfaces,
wherein the identity uniquely identifies the UE associated with the traffic or a subscriber associated with the UE or the traffic, and
wherein the traffic includes a set of parameters for the traffic;
determine, after determining the identity associated with the UE, a location of the UE based on a set of cells associated with a base station (BS), a respective set of beams associated with the set of cells, or a respective set of measurements for the respective set of beams;
monitor the traffic;
perform, after determining the location of the UE, a first analysis at various times
wherein the first analysis is related to measurements identified from monitoring the traffic and/or the set of parameters for the traffic;
identify, based on performing the first analysis at various times, a temporary interference to a beam of the respect set of beams;
perform, after determining the location of the UE:
a second analysis related to determining a user experience of a user of the UE, and
a third analysis related to determining a quality of a communication link between the UE and the BS, of a set of network slices associated with the UE, or of a quality of service (QoS) profile associated with the UE; and
perform, in association with performing the first analysis, the second analysis, and the third analysis, one or more actions related to addressing at least one of the temporary interference, the user experience, the quality of the communication link, of the set of network slices, or of the QoS profile.

16. The non-transitory computer-readable medium of claim 15, wherein the one or more instructions, when executed by the one or more processors, further cause the one or more processors to:
associate a location of the temporary interference with a subset of the respective set of beams by identifying at least one of:
a missing connected beam from the respective set of beams,
a missing surrounding beam from a set of surrounding beams associated with the UE, or
a measurement associated with the respective set of beams that satisfies a threshold.

17. The non-transitory computer-readable medium of claim 15, wherein the one or more instructions, that cause the one or more processors to identify the temporary interference, cause the one or more processors to:
identify a pattern of a beam reflection of a subset of the respective set of beams by identifying at least one of:
a pattern of an unexpected connected beam, of the respective set of beams, associated with the UE, or
a pattern of an unexpected surrounding beam, of the respective set of beams, associated with the UE,
wherein the pattern of the beam reflection is a result of the temporary interference.

18. The non-transitory computer-readable medium of claim 15, wherein the respective set of measurements for the respective set of beams identifies at least one of:
a respective reference signal received power (RSRP) of the respective set of beams,
a respective reference signal received quality (RSRQ) of the respective set of beams, or
a respective signal-to-interference-plus-noise ratio (SINK) of the respective set of beams.

19. The non-transitory computer-readable medium of claim 15, wherein the one or more instructions, when executed by the one or more processors, further cause the one or more processors to:
aggregate a respective result of performing the first analysis, the second analysis, and the third analysis across multiple UEs after performing the first analysis, the second analysis, and the third analysis for the multiple UEs,
wherein the multiple UEs include the UE; and
generate a set of recommendations related to reconfiguring a coverage or capacity of the set of cells or the respective set of beams after aggregating the respective result of performing the first analysis, the second analysis, and the third analysis across the multiple UEs.

20. The non-transitory computer-readable medium of claim 15, wherein the one or more instructions, when executed by the one or more processors, further cause the one or more processors to:
perform troubleshooting of an issue related to the UE after performing the first analysis, the second analysis, and the third analysis,
wherein the troubleshooting is related to addressing at least one of:
the temporary interference,
the user experience of the user of the UE, or
the quality of the communication link, of the set of network slices, or of the QoS profile.

* * * * *

UNITED STATES PATENT AND TRADEMARK OFFICE
CERTIFICATE OF CORRECTION

PATENT NO. : 10,979,326 B2
APPLICATION NO. : 16/232814
DATED : April 13, 2021
INVENTOR(S) : Eng Wei Koo It is certified that error appears in the above-identified patent and that said Letters Patent is hereby corrected as shown below:

In the Claims

In Claim 18, Column 34, Line 23, "(SINK) of the respective set of beams." should be changed to --(SINR) of the respective set of beams.--.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*